(12) United States Patent
Koshika et al.

(10) Patent No.: US 8,176,344 B2
(45) Date of Patent: May 8, 2012

(54) INFORMATION PROCESSING APPARATUS AND CONTROL METHOD THEREOF

(75) Inventors: Takashi Koshika, Kitami (JP); Hidenori Higashi, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 426 days.

(21) Appl. No.: 12/396,229

(22) Filed: Mar. 2, 2009

(65) Prior Publication Data

US 2009/0235102 A1  Sep. 17, 2009

(30) Foreign Application Priority Data

Mar. 3, 2008  (JP) ................. 2008-052577

(51) Int. Cl.
*G06F 1/32* (2006.01)
*G06F 1/26* (2006.01)
*G06F 12/00* (2006.01)

(52) U.S. Cl. ........ 713/310; 713/300; 713/320; 713/321; 713/323; 713/330; 711/100; 711/115; 711/162; 711/163

(58) Field of Classification Search .......... 713/300, 713/310, 320–324, 330, 340; 711/100, 115, 711/162, 163
See application file for complete search history.

(56) References Cited

U.S. PATENT DOCUMENTS

| 6,647,499 | B1* | 11/2003 | Morcom ........................ 713/300 |
| 7,020,040 | B2* | 3/2006 | Lin ............................... 365/229 |
| 7,779,221 | B1* | 8/2010 | Tsypliaev et al. ............. 711/165 |
| 2002/0169928 | A1* | 11/2002 | Kimura et al. ............... 711/137 |
| 2008/0215871 | A1* | 9/2008 | Chan ................................. 713/2 |

FOREIGN PATENT DOCUMENTS

| CN | 1403923 A | 3/2003 |
| JP | 2004-074621 A | 3/2004 |

OTHER PUBLICATIONS

Chinese Office Action dated Apr. 14, 2010.

* cited by examiner

*Primary Examiner* — Kim Huynh
*Assistant Examiner* — Fahmida Rahman
(74) *Attorney, Agent, or Firm* — Canon USA Inc. IP Division

(57) ABSTRACT

An information processing apparatus used to reduce power supply to nonvolatile memory when in power saving mode. To accomplish this, the information processing apparatus stores data in the nonvolatile memory that can be used in power saving mode to a volatile memory to which power will still be supplied while in power saving mode. Further, the information processing apparatus enables the operating system to recognize the storage area in which the data is stored as a replacement for the nonvolatile memory.

10 Claims, 26 Drawing Sheets

F I G. 20
| PROCESS ID | OPERABLE IN POWER SAVING MODE |
|---|---|
| 25 | YES |
| 26 | YES |
| 27 | NO |
F I G. 21
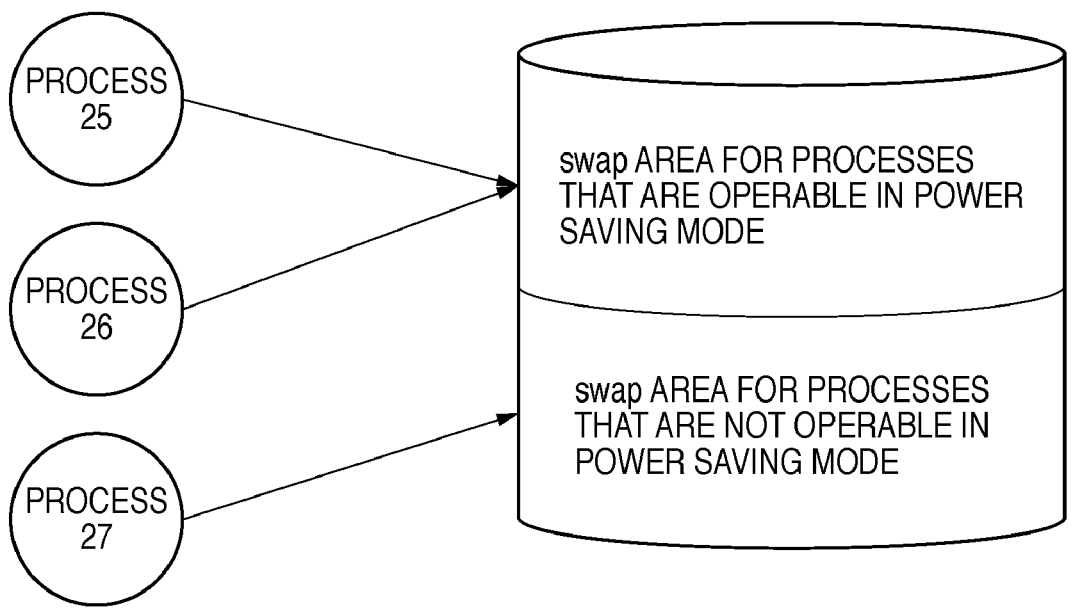

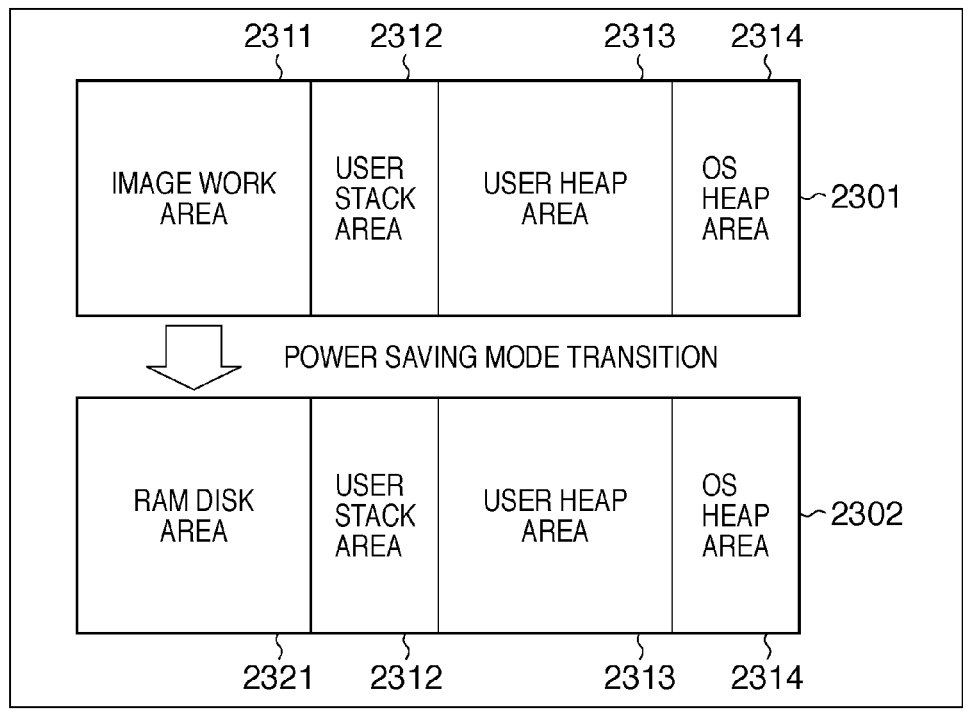

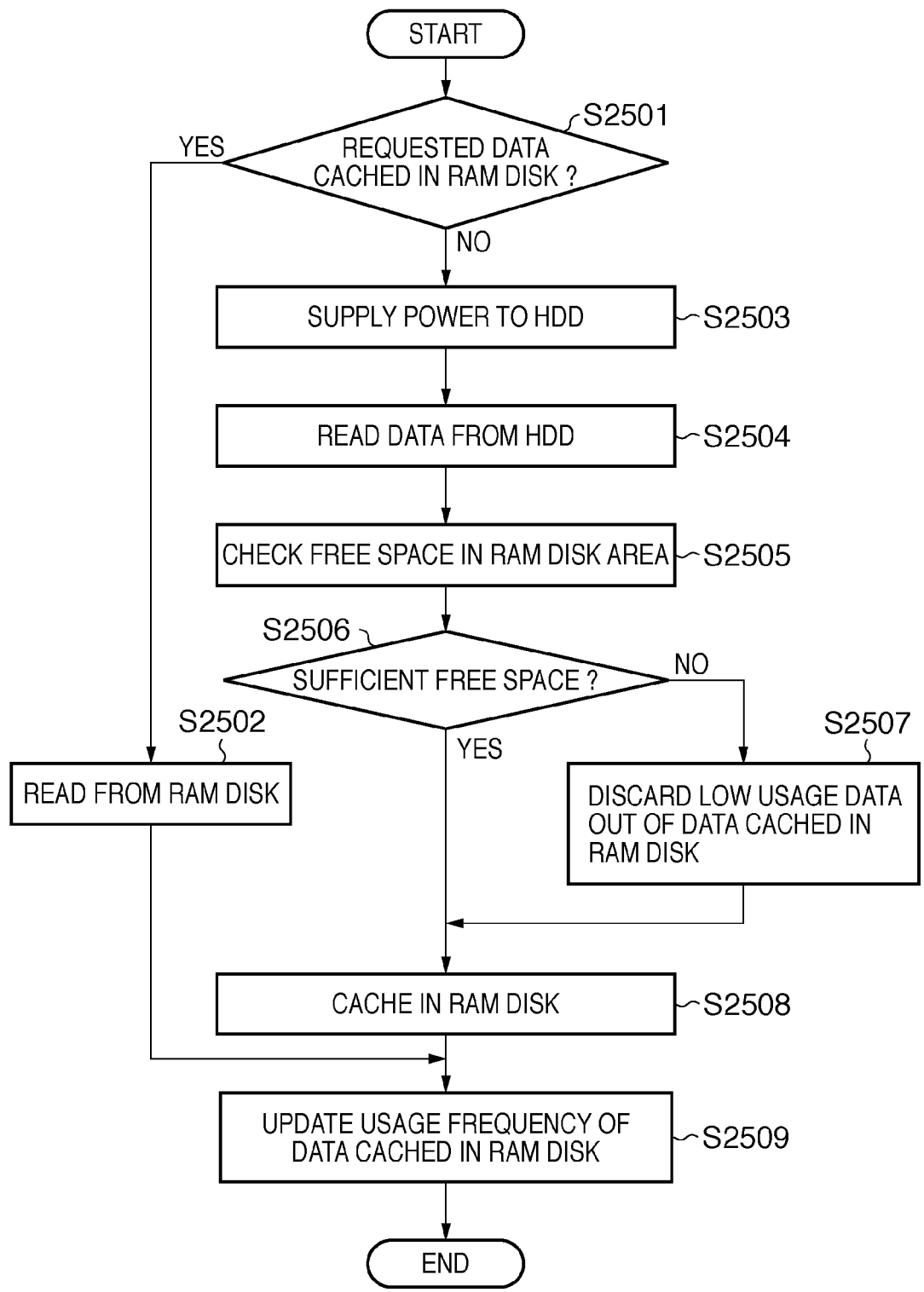

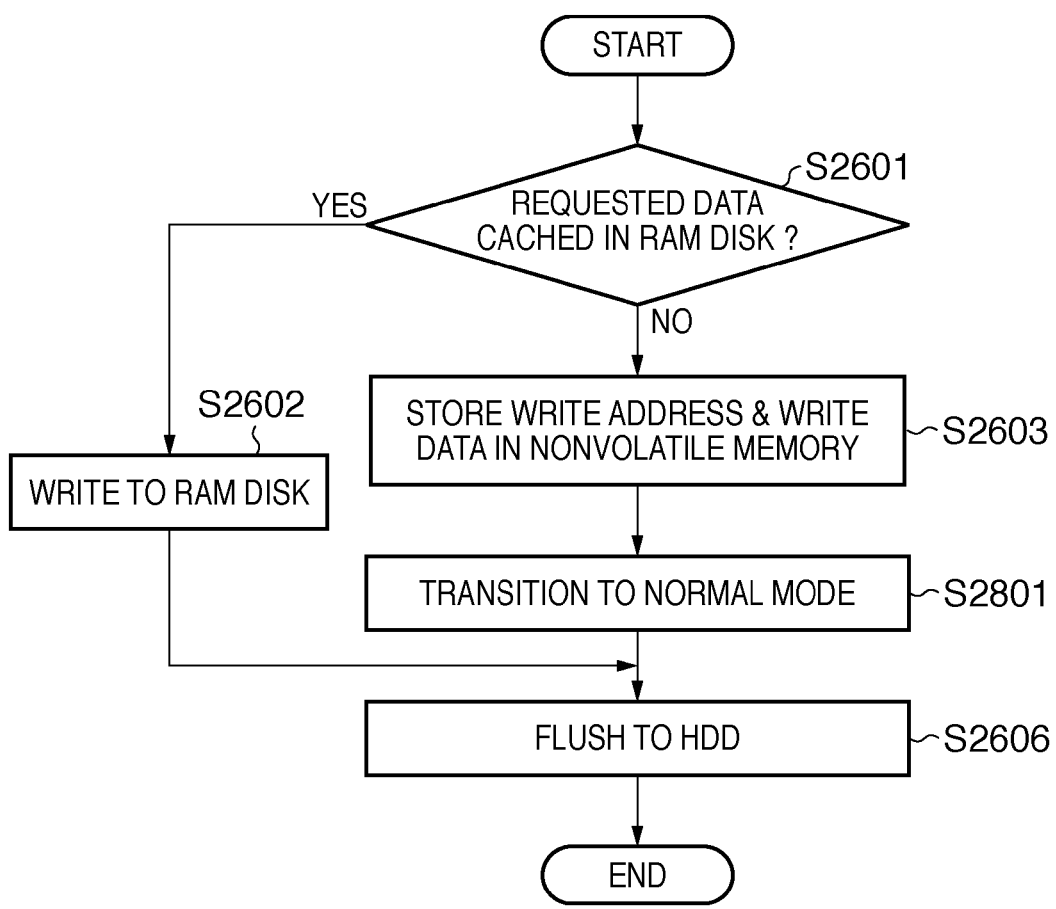

INFORMATION PROCESSING APPARATUS AND CONTROL METHOD THEREOF

BACKGROUND OF THE INVENTION

1. Field of the Invention

The present invention relates to an information processing apparatus that has a plurality of operating modes including a power saving mode and to a control method thereof.

2. Description of the Related Art

With regard to power saving in an information processing apparatus, measures are being considered for suppressing power consumption by reducing power supply to hardware not being used when the information processing apparatus is idle. An operating mode in which power consumption is decreased relative to normal operation is called a power saving mode.

For example, Japanese Patent Application Laid-Open No. 2004-074621 proposes a technique of reducing power supply to nonvolatile memory such as the hard disk of an information processing apparatus in power saving mode, in order to reduce power consumed by nonvolatile memory.

Recent information processing apparatuses have started employing a general-purpose operating system (hereinafter, general-purpose OS). Many general-purpose OSs access the hard disk at an arbitrary time. Consequently, with an information processing apparatus employing a general-purpose OS, power still needs to be supplied to the hard disk in power saving mode, preventing power consumption from being sufficiently reduced.

In the case of a general-purpose OS having a demand paging function of only allocating memory pages that have been accessed to physical memory, for example, anticipating when the text area of an executable file or a library will be loaded from a file can be difficult. Also, in the case of a general-purpose OS having a swap function of saving data that does not fit in memory to hard disk, anticipating the swap in and swap out timing can be difficult. Further, while many open source applications can generally be used with a general-purpose OS, completely ascertaining and regulating the file access timing of these applications can be difficult. Thus, in an information processing apparatus employing a general-purpose OS, power supply to nonvolatile memory cannot be reduced even when operating in power saving mode. Consequently, power needs to be supplied to both nonvolatile memory and blocks controlling nonvolatile memory, preventing power consumption from being sufficiently reduced even in power saving mode.

SUMMARY OF THE INVENTION

The present invention enables realization of an information processing apparatus that is provided with a volatile first storage unit and a nonvolatile second storage unit, and that reduces power supply to the second storage unit in power saving mode, and maintains power saving mode without resuming power supply to the second storage unit even if there is an access to the second storage unit by an operating system of the information processing apparatus.

One aspect of the present invention provides an information processing apparatus that is provided with a volatile first storage unit and a nonvolatile second storage unit and that has, a normal operating mode and a power saving mode in which power consumption is reduced relative to the normal operating mode, including a storing unit configured to, when the operating mode transitions from the normal operating mode to the power saving mode, store a portion of data stored in the second storage unit in the first storage unit; a recognition unit configured to cause an operating system of the information processing apparatus to recognize a storage area of the first storage unit in which the portion of data was stored as a storage unit replacing the second storage unit; and a power control unit configured to reduce power supply to the second storage unit in response to the storage unit replacing the second storage unit becoming recognizable by the operating system.

Further features of the present invention will be apparent from the following description of exemplary embodiments with reference to the attached drawings.

BRIEF DESCRIPTION OF THE DRAWINGS

FIG. 20 shows operating processes in power saving mode according to the second embodiment.

FIG. 21 illustrates a variation of the second embodiment.

FIG. 23 shows the content of memory in the MFP 101 according to the third embodiment.

FIG. 24 shows a transfer data selection table 2400 for selecting data to be transferred to a RAM disk area 2321 according to the third embodiment.

FIG. 25 is a flowchart showing a processing procedure in the case where a request to read data on the secondary storage unit 313 occurs while in power saving mode according to the third embodiment.

FIG. 27 shows an update table 2700 stored in nonvolatile memory according to the third embodiment.

FIG. 28 is a flowchart showing a variation of FIG. 26.

DESCRIPTION OF THE EMBODIMENTS

Various embodiments of the present invention will now be described in detail with reference to the drawings. It should be noted that the relative arrangement of the components, the numerical expressions and the numerical values set forth in these embodiments do not limit the scope of the present invention unless it is specifically stated otherwise.

Figure 1:
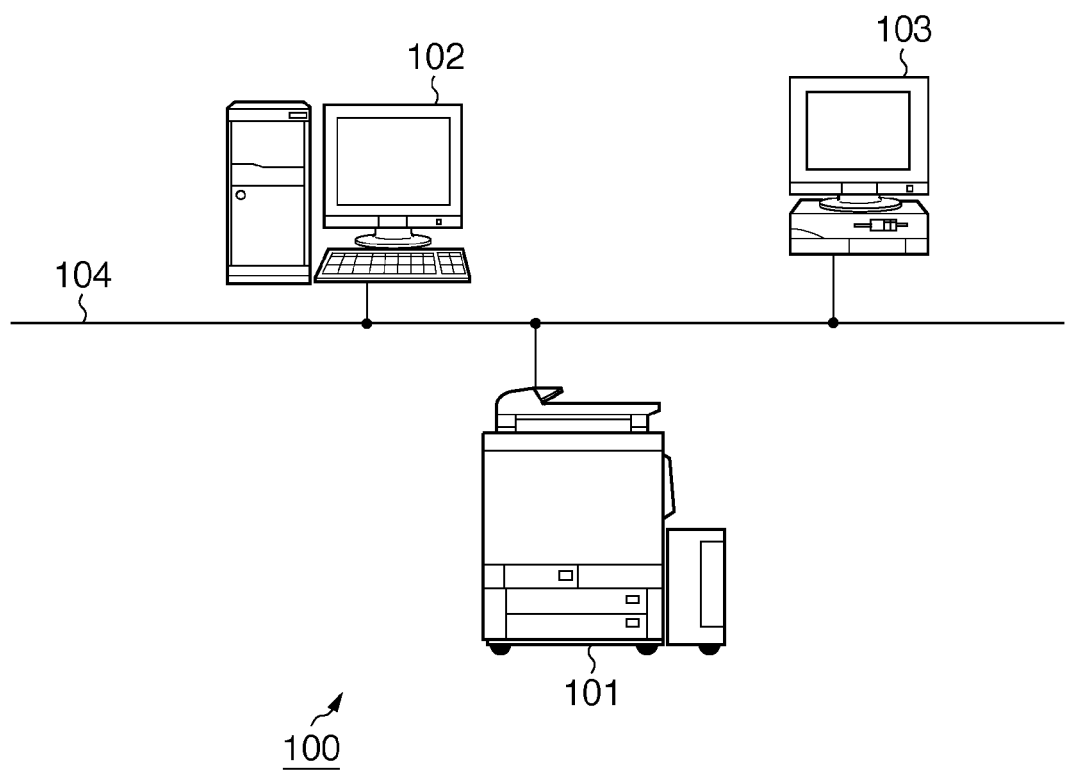
FIG. 1 shows an exemplary configuration of an entire system according to a first embodiment.

Hereinafter, a first embodiment will be described with reference to FIGS. 1 to 18. FIG. 1 shows an exemplary configuration of an entire system according to the first embodiment.

The system 100 is provided with a multifunction printer (MFP) 101, a client PC 103 and a print server 102. The devices are connected by a network 104 so that each device is able to perform data transmission and reception. While FIG. 1 shows an example in which each device is connected, the present invention is not limited by this and may be constituted with a plurality of each device connected. The MFP 101, which constitutes an exemplary information processing apparatus, is an image forming apparatus with various functions such as scan, print and copy.

The client PC 103 acts to edit input application files and supply print instructions or print ready files, and to assist in the monitoring and control of devices and jobs managed within the print server 102. There exist methods of transferring print data generated by the client PC 103 directly to the MFP 101, and methods of transferring print data generated by the client PC 103 to the MFP 101 via the print server 102.

The print server 102 has the following two roles. Firstly, the print server 102 acts to control transmission and reception of information between the MFP 101 and an external device, and notify information such as status and the like to the external device when a job is completed by the MFP 101, having firstly received input of image information, setting information and the like of the job to be printed. Secondly, the print server 102 acts to centrally manage jobs input from external devices and jobs generated within the MFP 101. Also, the print server 102 monitors all functions within the MFP 101 and the status of all jobs, and can perform control to pause a job, change settings, resume printing, or duplicate, move or delete a job.

Figure 2:
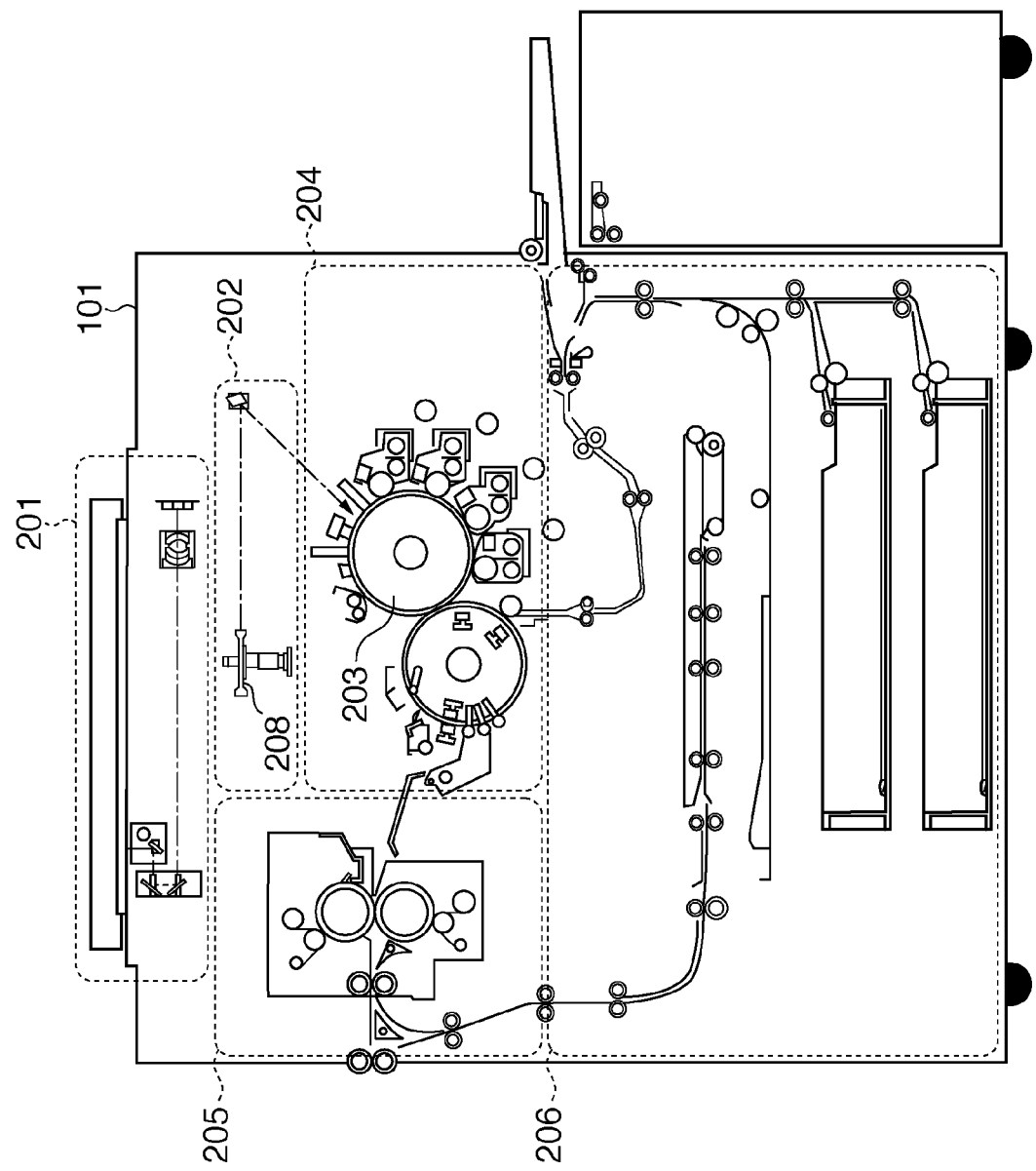
FIG. 2 shows an exemplary hardware configuration of an MFP 101 according to the first embodiment.

Next, the configuration of the MFP 101 will be described with reference to FIG. 2. FIG. 2 shows an exemplary hardware configuration of the MFP 101 according to the first embodiment. The MFP 101 according to the present embodiment is capable of color printing and is constituted by a scanner unit 201, a laser exposure unit 202, a photosensitive drum 203, an image forming unit 204, a fixing unit 205, a feed/conveyance unit 206, and a printer controller (not shown) for controlling these components.

The scanner unit 201 optically reads an original image by illuminating an original placed on an original platen, and converts the image to an electrical signal to create image data.

The laser exposure unit 202 causes a light beam such as laser light modulated according to the image data to be incident a rotating polygon mirror 208 that rotates at an equiangular velocity and irradiate the photosensitive drum 203 as reflected scanning light.

The image forming unit 204 rotationally drives the photosensitive drum 203, charges the photosensitive drum 203 using a charger, develops a latent image formed on the photosensitive drum 203 by the laser exposure unit 202 using toner, and transfers the resultant toner image to a sheet. A series of electrophotographic processes for recovering the small amount of toner that remains on the photosensitive drum 203 without being transferred at this time is executed and an image is formed. At this time, a sheet is wrapped around a prescribed position of a transfer drum, and developing units (developing stations) that respectively have magenta (M), cyan (C), yellow (Y) and black (B) toner repeatedly execute the aforementioned electrophotographic processes sequentially in turn, while the sheet is rotated four times. The sheet to which the four color, full-color toner image has been transferred after the four rotations separates from the transfer drum and is conveyed to the fixing unit 205.

The fixing unit 205, which may include a combination of rollers and a belt and incorporates a heat source such as a halogen heater, fuses and fixes the toner on the sheet to which the toner image has been transferred by the image forming unit 204 using heat and pressure.

The feed/conveyance unit 206, which is provided with one or more sheet repositories typified by sheet cassettes or paper decks, separates one sheet from the plurality of sheets housed in a sheet repository according to an instruction from the printer controller, and conveys the sheet to the image forming unit 204. The sheet is then wrapped around the transfer drum of the image forming unit 204 and rotated four times, before being conveyed to the fixing unit 205. The aforementioned YMCK toner image is transferred to the sheet during the four rotations. In the case of image forming on both sides of the sheet, control is performed so that the sheet which has passed through the fixing unit 205 again passes along the conveyance path to the image forming unit 204.

The printer controller communicates with an MFP controller that performs overall control of the MFP 101, and manages the states of the scanner unit 201, the laser exposure unit 202, the image forming unit 204, the fixing unit 205 and the feed/conveyance unit 206 in accordance with instructions from the MFP controller. The printer controller further executes control so as to enable all of the components to maintain harmony and operate smoothly.

Figure 3:
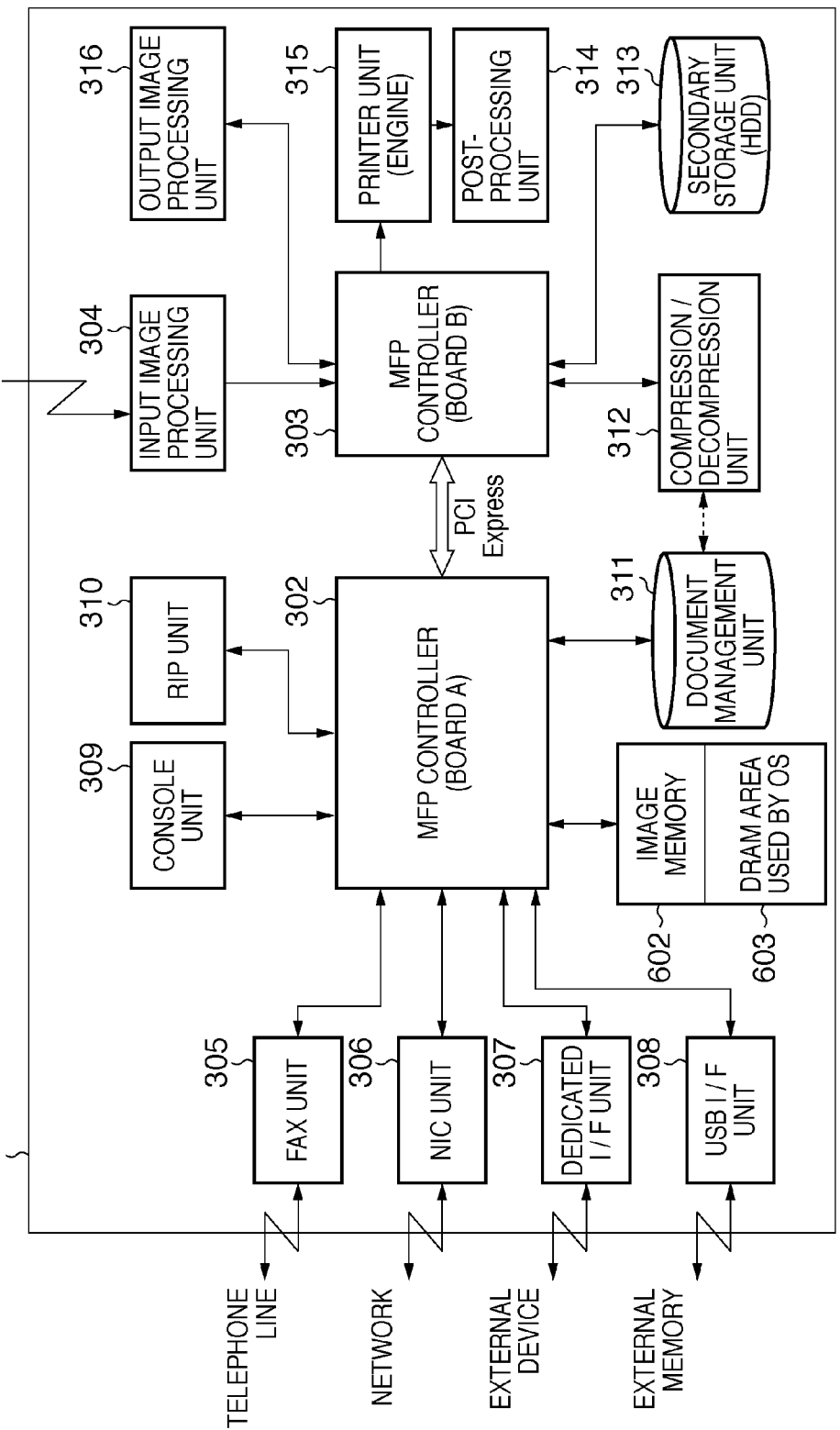
FIG. 3 shows an exemplary configuration of a controller 301 of the MFP 101 according to the first embodiment.

Next, a control configuration of the MFP 101 will be described with reference to FIG. 3. FIG. 3 shows an exemplary configuration of a controller 301 of the MFP 101 according to the first embodiment.

The controller 301 is constituted by the two controller boards MFP controllers 302 and 303. The MFP controller 303 constituting a board B has a function relating to image processing that requires real-time processing, with a real-time OS being employed. The MFP controller 302 constituting a board A has a function relating to image processing that does not require real-time processing, with a general-purpose OS being employed. These two boards are connected by PCI-Express, enabling data communication between the MFP controllers 302 and 303.

The MFP controllers 302 and 303 function as a storing unit, a recognition unit, a power control unit, an access restriction unit, an updating unit and a modification unit which constitute features of the present invention. A detailed description of each of these units will be given below.

The MFP 101 is an image forming apparatus equipped with a memory, such as a hard disk, capable of storing a plurality of job data in the MFP 101, as well as being equipped with a copy function and a print function. The copy function enables job data output from a scanner to be printed with a printer unit 315 via the memory. The print function enables job data output from an external device, such as a computer, to be printed with the printer unit 315 via the memory.

There are both full color MFPs 101 and monochrome MFPs 101, and since a full color device includes the basic configuration of a monochrome device except for the color processing, internal data and the like, a full color device will be described herein. Description of a monochrome device will be added as necessary.

The system 100, in addition to having a multifunction image forming apparatus (MFP) equipped with a plurality of functions, may be provided with a single function printer (SFP) constituting a single function image forming apparatus equipped with only a print function. The system may be constituted by only one type of image forming apparatus or a plurality of either type of image forming apparatus.

As shown in FIG. 3, the controller 301 is provided with an input image processing unit 304 that reads an image such as a paper original and performs image processing on the read image data, and a FAX unit 305 that performs image transmission and reception using a telephone line. The controller 301 is also provided with a network interface card (NIC) unit 306 that exchanges image data, device information and the like using the network, and a dedicated interface unit 307 that performs information exchange of image data and the like with an external device. The controller 301 is also provided with a universal serial bus (USB) interface unit 308 that performs transmission and reception of image data and the like with a USB device typified by a USB memory. The controller 301 further acts to organize data traffic, which involves temporarily saving image data, determining paths and the like according to the application of the MFP 101.

A document management unit 311 is equipped with a memory for storing a plurality of image data. The controller 301 is also equipped with a secondary storage unit 313. For discussion purposes, the secondary storage unit 313 is referred to as a hard disk drive 313 throughout the Specification by way of example and not of limitation. In this regard, any memory unit that enables implementation of the various embodiments of the present invention may be used. The MFP controller 302 may control a plurality of types of image data of various images to be storable on the hard disk, and controls output processing such as print processing by the printer unit 315 to be executable by appropriately reading out image data stored on the hard disk and transferring the read image data to an output unit such as the printer unit 315. Image data includes data from the input image processing unit 304, data input via the FAX unit 305, data from an external device input via the NIC unit 306, and data input via the dedicated I/F unit 307 or the USB I/F unit 308. The MFP controller 302 also controls image data read out from the hard disk to be transferable to an external device such as a computer or another image forming apparatus as a result of an instruction from an operator. This hard disk is actually on the board B and is connected so that the board A can directly access the hard disk on the board B.

A compression/decompression unit 312 compresses and stores image data as necessary when storing image data to the document management unit 311 and, conversely, decompresses compressed image data into the original image data when reading out stored image data that has been compressed. The use of compressed data such as JPEG, JBIG or ZIP files is generally known when data passes through a network, with data being decompressed in the compression/decompression unit 312 after being input to the MFP 101.

The controller 301 is provided with a resource management unit (not shown). The resource management unit stores various commonly handled parameter tables such as fonts, color profiles and gamma tables. This data can be called as necessary, and new parameter tables can be stored, revised and updated.

If page description language (PDL) data is inputted, the MFP controller 302 performs raster image processor (RIP) processing with a RIP unit 310, and performs image processing for printing an image to be printed with an output image processing unit 316 as necessary. Further, intermediate data and print ready data (bitmap data for printing or compressed bitmap data) of image data generated at this time can also be stored again with the document management unit 311 as necessary.

This data is sent to the printer unit 315 when performing image forming. Sheets printed out by the printer unit 315 are sent to a post-processing unit 314, where sorting and finishing processes are performed on the sheets.

Here, the MFP controllers 302 and 303 act to allow jobs to flow smoothly, with pass switching (described below) being performed according to the way in which the MFP 101 is used. While the storing of image data as intermediate data as necessary is generally known, access other than that where the document management unit 311 forms the start point or the end point will not be described here. Also, description will be given to enable the general flow to be understood, while omitting the processing of the compression/decompression unit 312 and the post-processing unit 314, which are used as necessary, and the processing of the MFP controllers, which forms the core of the entire MFP 101.

A) Copy Function: input image processing unit→output image processing unit→printer unit
B) Fax Transmission Function: input image processing unit→fax unit
C) Fax Reception Function: fax unit→output image processing unit→printer unit
D) Network Scan: input image processing unit→NIC unit
E) Network Print: NIC unit→RIP unit→output image processing unit→printer unit
F) Scan to External Device: input image processing unit→dedicated I/F unit
G) Print from External Device: dedicated I/F unit→output image processing unit→printer unit
H) Scan to External Memory: input image processing unit→USB I/F unit
I) Print from External Memory: UBS I/F unit→RIP unit→output image processing unit→printer unit
J) Box Scan Function: input image processing unit→output image processing unit→document management unit
K) Box Print Function: document management unit→printer unit
L) Box Reception Function: NIC unit→RIP unit→output image processing unit→document management unit
M) Box Transmission Function: document management unit→NIC unit
N) Preview Function: document management unit→console unit Combinations of various other functions including an email service and a web server function, while conceivable, are not described herein.

Box scan, box print, box reception and box transmission are processing functions of the MFP 101 associated with writing and reading out data using the document management unit 311. These functions involve temporarily saving data after partitioning the memory in the document management unit 311 per job or per user, and performing data input/output in combination with a user ID and a password.

Further, a console unit 309 is for selecting the above flows and functions and giving operation instructions. Following increases in the resolution of display devices for the console unit 309, image data in the document management unit 311 can also be previewed and then printed if confirmed to be okay.

Figure 4:
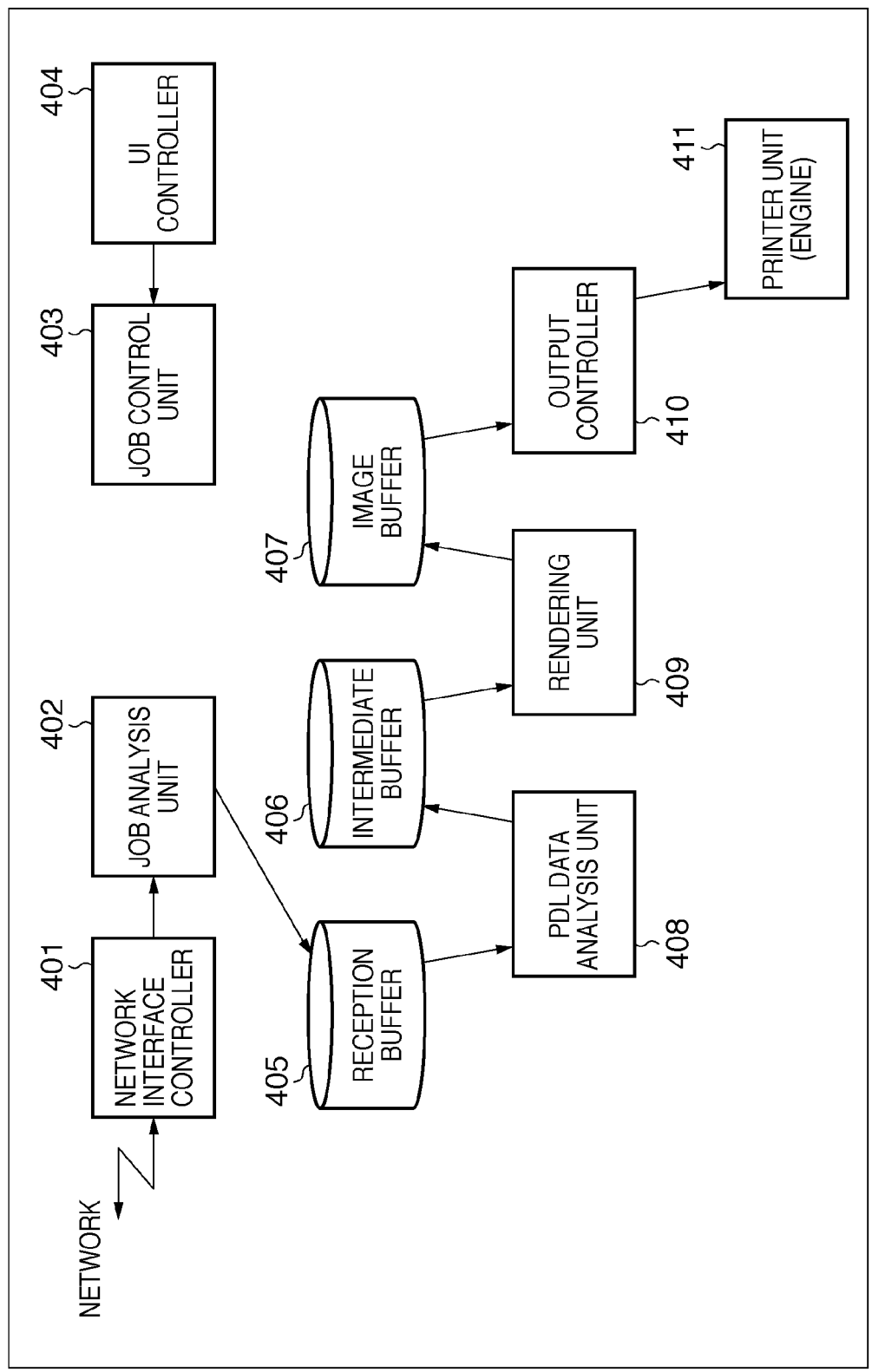
FIG. 4 shows a firmware structure of MFP controllers 302 and 303 according to the first embodiment.

Next, the control structure of the MFP controllers 302 and 303 will be described with reference to FIG. 4. FIG. 4 shows a firmware structure of the MFP controllers 302 and 303 according to the first embodiment.

A network interface controller 401 is connected to a network via an interface cable. The network interface controller 401 administers communication with a host computer, analyzes communication protocols, receives data input from the host computer, and transfers received data to a job analysis unit 402. The job analysis unit 402 analyzes jobs and conveys the attributes of jobs to a job management unit, registers jobs in a management table (not shown), and stores PDL data in a reception buffer 405.

A PDL data analysis unit 408 starts processing when PDL data is stored in the reception buffer 405. The PDL data analysis unit 408 reads PDL data stored in the reception buffer 405, analyzes the PDL data and generates an object (intermediate code) corresponding to each command, and stores the objects in an intermediate buffer 406. According to the present embodiment, commands supported by the MFP 101 are in a PDL, although all data that can be printed per page is similarly supported, not only PDL data. Intermediate data is managed per page.

A rendering process unit 409 operates when data is stored in the intermediate buffer 406. The rendering process unit 409 reads out intermediate data from the intermediate buffer 406 per page, generates single pages of print image data, and stores the print image data in an image buffer 407. An output controller 410 operates when a single page of print image data is generated. Actual printing is performed as a result of the output controller 410 reading out image data from the image buffer 407, converting the image data to a video signal, and transferring the video signal to a printer unit 411.

A user interface (UI) controller 404 controls a user interface and is constituted by a display unit and the console unit 309. A liquid crystal display (LCD) or the like is used for the display unit. Keys are disposed on the console unit 309. In the case of a touch panel display, the display unit may double as the console unit 309. The UI controller 404 controls display of character strings, switching of screens, transmission of setting values to other modules, and the like according to user operations. A job control unit 403 manages jobs in the device, controlling generation and deletion of jobs, job status, job processing order, and the like.

Figure 5:
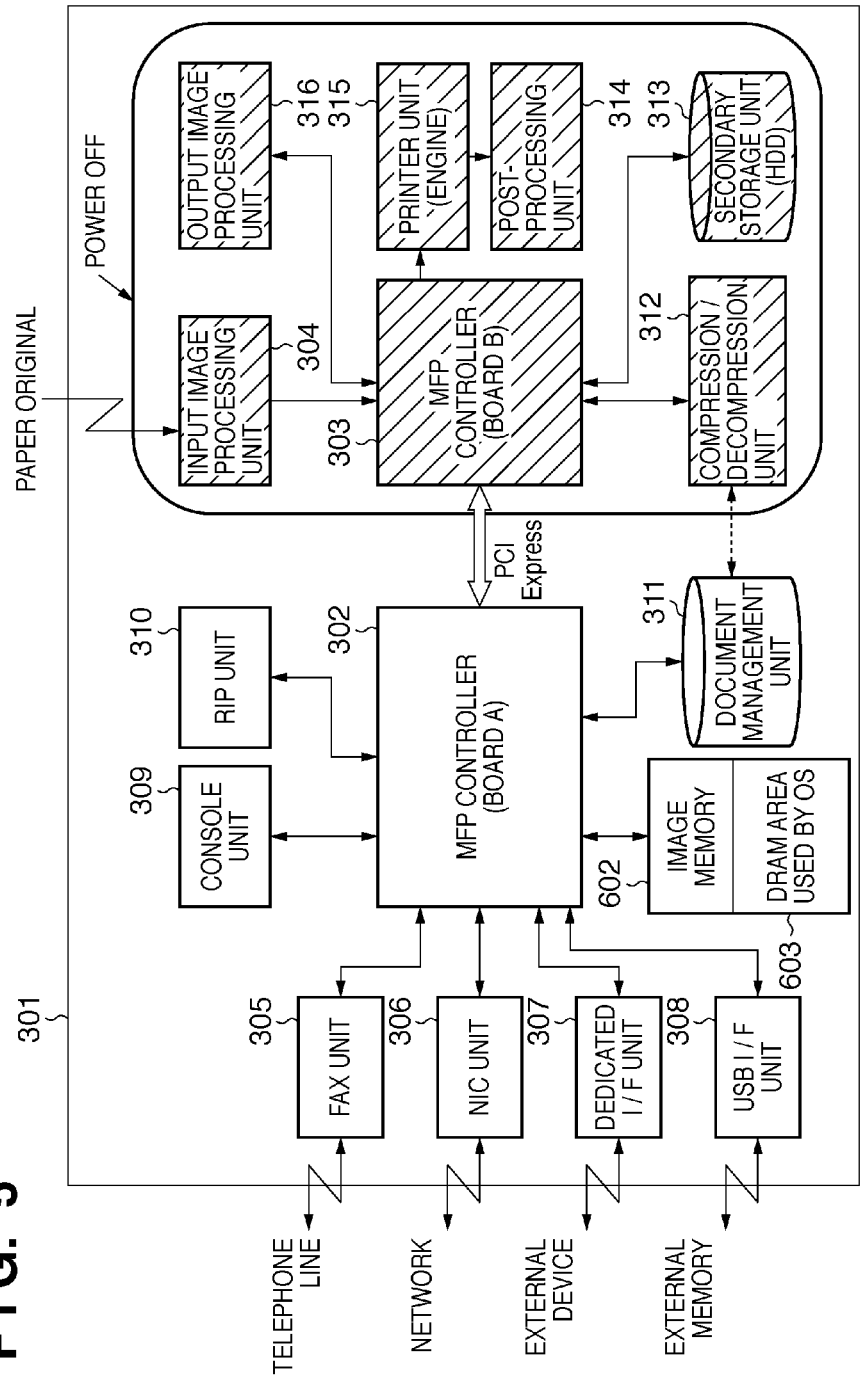
FIG. 5 shows a power supply state in power saving mode according to the first embodiment.

FIG. 5 shows a power supply state in power saving mode according to the first embodiment. FIG. 5 represents power not being supplied to the module of the shaded blocks. That is, in power saving mode, power supply to the board B and devices (excluding board A) connected to the board B is reduced. Thus, in power saving mode, power consumption is reduced by supplying power to only some of the devices. This power control is mainly performed by the MFP controller 302.

Figure 6:
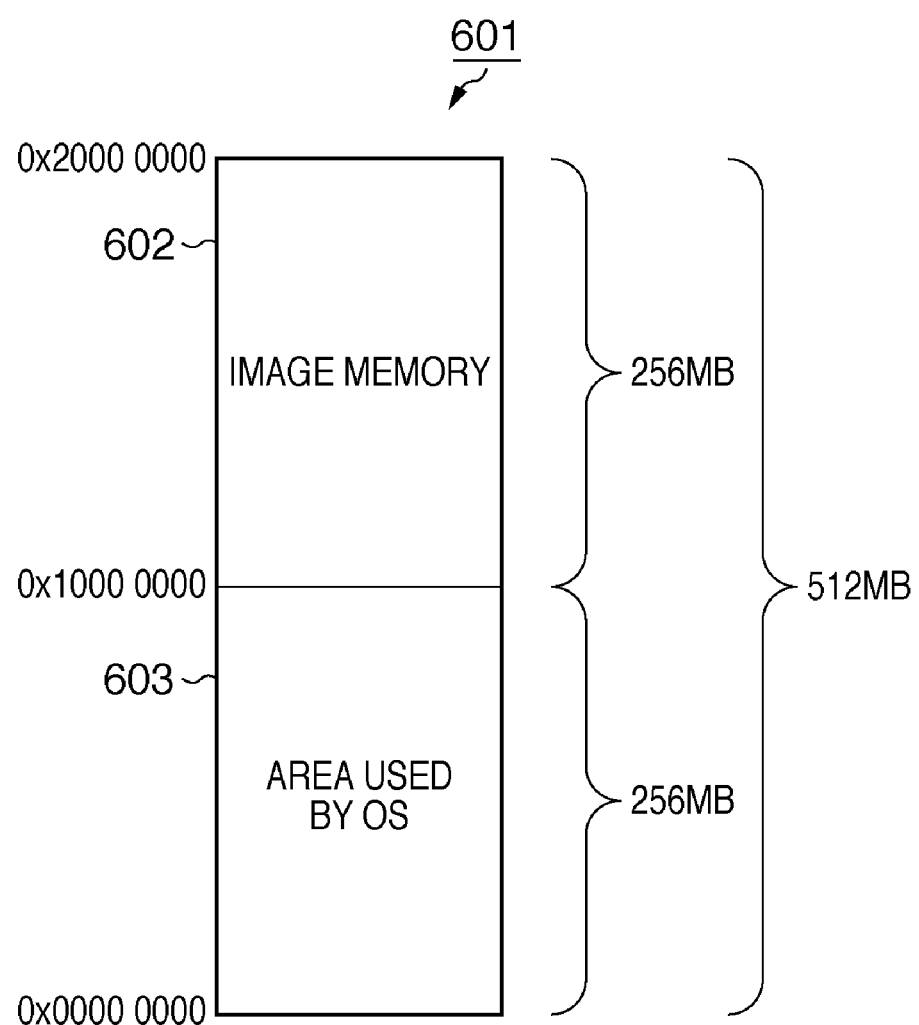
FIG. 6 shows data stored in a volatile memory 601 according to the first embodiment.
Figure 12:
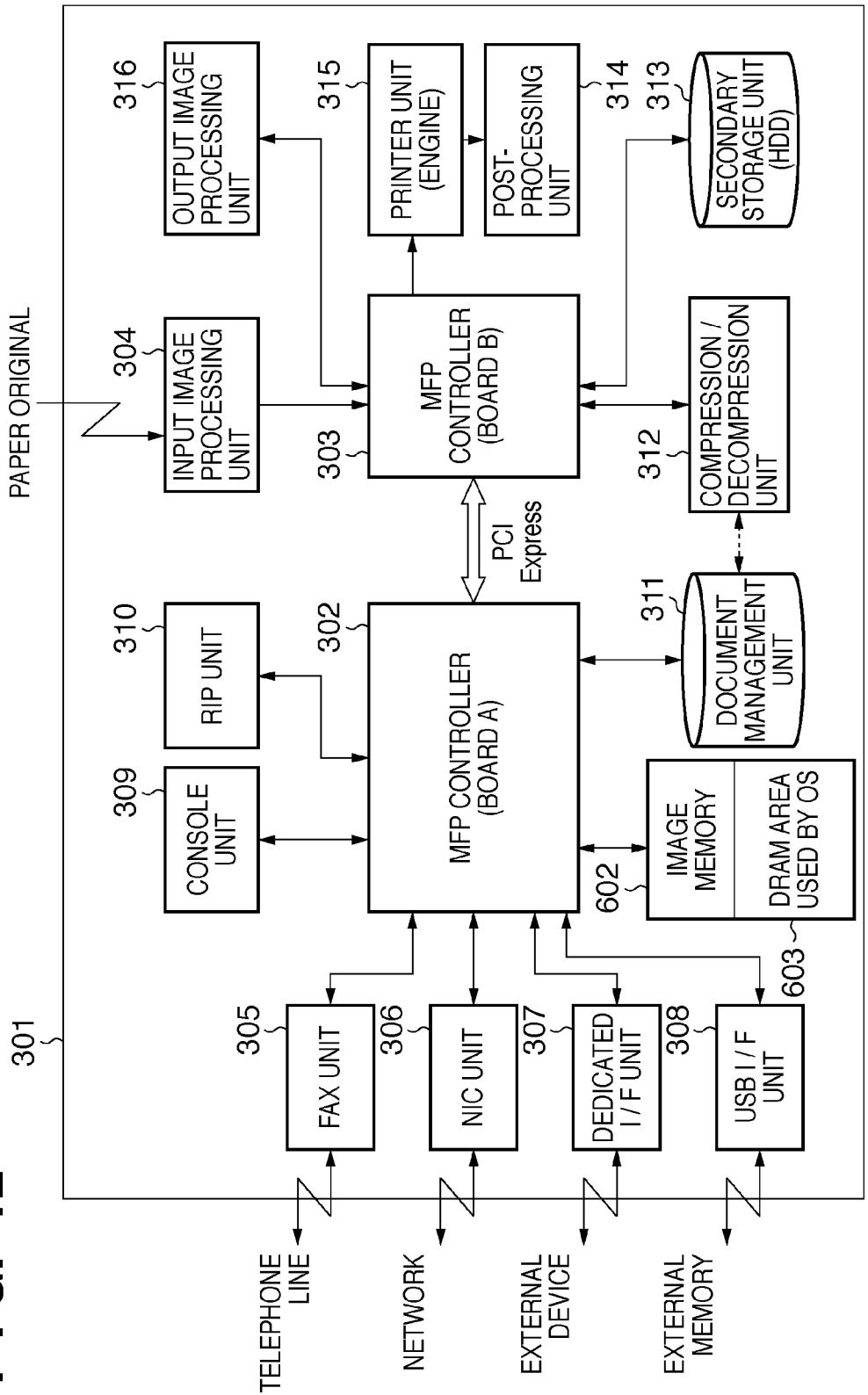
FIG. 12 shows file access points in normal operating mode and in power saving mode according to the first embodiment.

FIG. 6 shows the content of a volatile memory 601 according to the first embodiment. The volatile memory 601 functions as a volatile first storage unit, and is, broadly speaking, provided with an area 603 that is used directly by the OS and an area 602 for storing image data and PDL data that is not used directly by the OS. Hereinafter, the latter will be referred to as an image memory 602. In the present embodiment, the capacity of the volatile memory 601 is 512 MB, the capacity of the area 603 used by the OS is 256 MB, and the capacity of the image memory 602 is 256 MB, although these capacities are not limiting and may be changed freely. The volatile memory 601 is connected to the MFP controller 302 as shown in FIG. 12.

Figure 7:
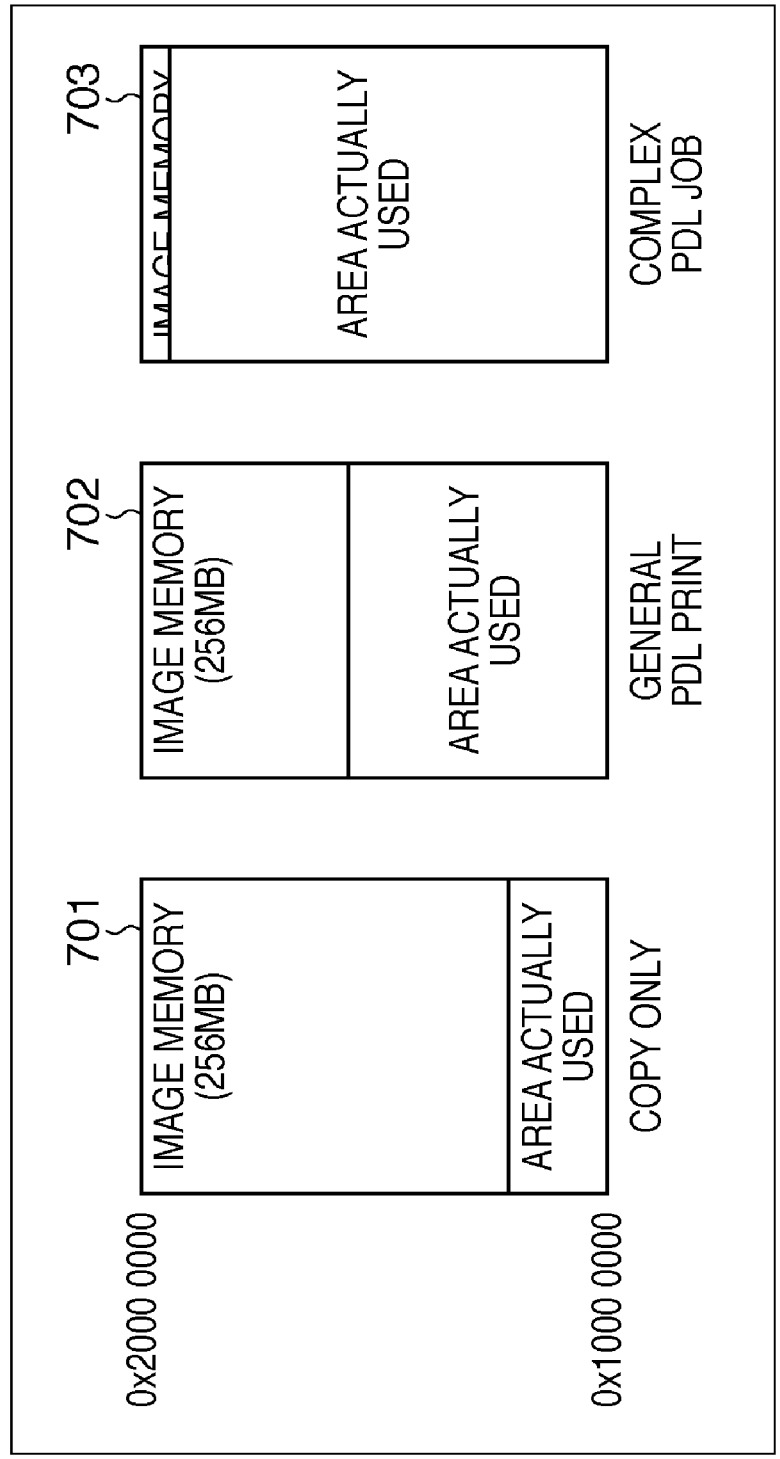
FIG. 7 shows the content of an image memory 602 according to the first embodiment.

FIG. 7 shows the content of the image memory 602 according to the first embodiment. The image memory 602 is a large area for storing image data and PDL data. However, the entire area is not often used, with only a small amount of the capacity being used if only copying, as denoted by reference numeral 701. Approximately half of the image memory 602 is used in the case of general PDL printing, as denoted by reference numeral 702. Substantially the entire area of the image memory 602 is used only when a large amount of complex PDL data is received, as denoted by reference numeral 703. The image memory 602 is used from the start thereof, and the maximum area used is also stored.

Figure 8:
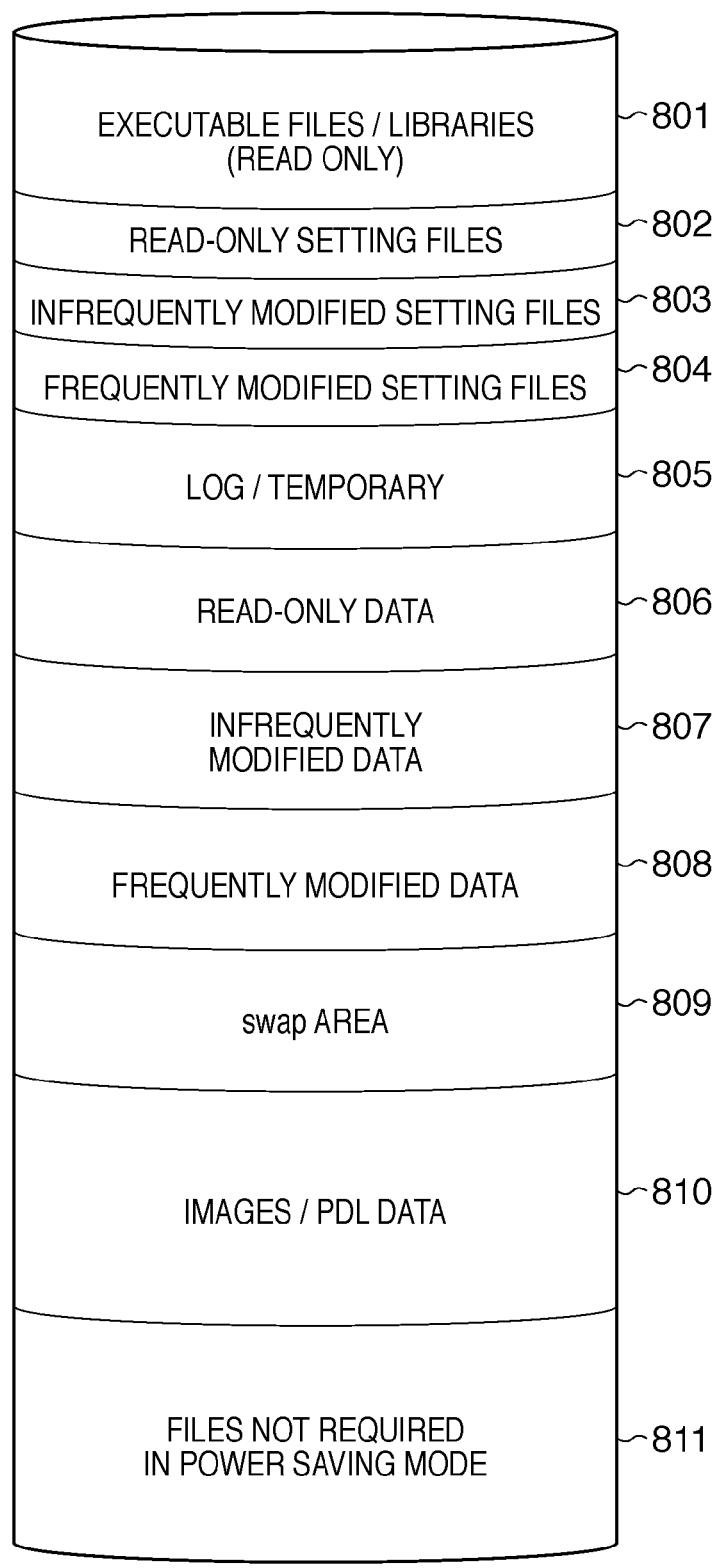
FIG. 8 shows a partition configuration of a secondary storage unit 313 according to the first embodiment.

FIG. 8 shows a partition configuration of the hard disk drive 313 according to the first embodiment. Files not required when in power saving mode are placed together in one or a plurality of partitions. Here, files not required when in power saving mode are divided between partitions 801 to 811.

The executable files of programs, shared libraries and the like are placed in an executable file/library partition 801. Setting files that will not be rewritten during processing such as the resolution of the console unit LCD and partition configuration information of the hard disk are placed in a read-only setting file partition 802. Setting files changed by a user via the console unit 309 such as IP addresses and other network settings and administrator passwords are placed in an infrequently modified setting file partition 803. Setting files that are automatically rewritten by programs such as settings for PDL printing that are rewritten for each PDL job are placed in a frequently modified setting file partition 804. Debugging logs, work files and the like are placed in a log/temporary partition 805. Font information, template image data displayed on the LCD and the like are placed in a read-only data partition 806. Data that is modified relatively infrequently such as address books and other data rewritten by a user via the console unit 309 and the license information of applications installed on the image forming apparatus are placed in an infrequently modified data partition 807.

Data that is rewritten relatively frequently by programs such as data saved in a box, component data saved as a cache during PDL printing and job histories are placed in a frequently modified data partition 808. Data saved by the OS due to insufficient memory capacity is placed in a swap storage area partition 809. Image data and PDL data rewritten per job is placed in an image/PDL partition 810. The partition 810 is included in a partition 811 for files not required when in power saving mode. The files placed in each partition are predetermined.

Figure 9:
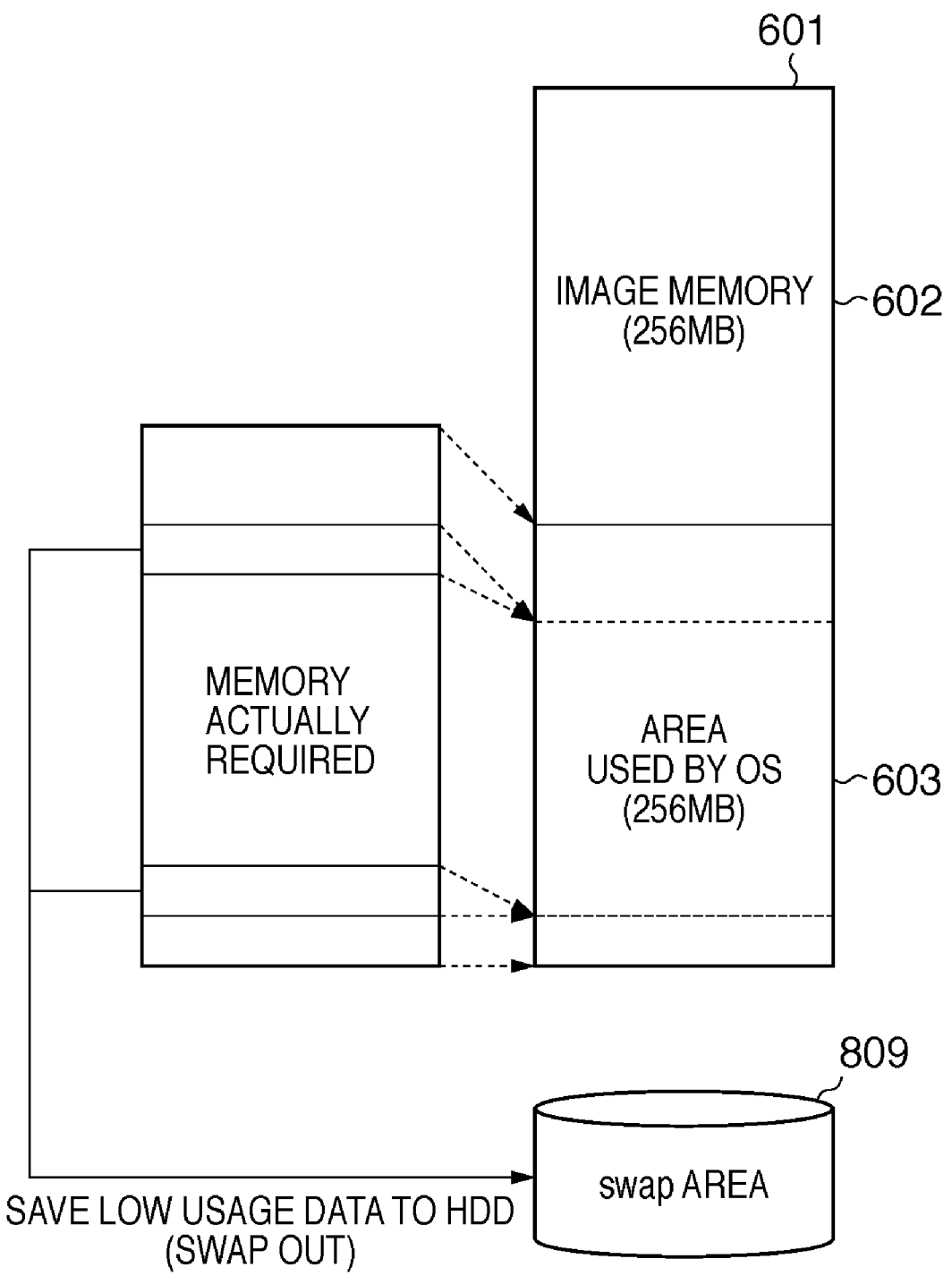
FIG. 9 illustrates swapping.

Next, swapping will be described with reference to FIGS. 9 and 10. Swapping is a mechanism whereby data that will not fit in the storage area of the volatile memory 601 used by the general-purpose OS executed by the MFP controller 302 is saved to the hard disk drive 313. The process of saving data is called swapping out, with the data being written to the swap partition (storage area of the hard disk drive 313). Data that is infrequently used by the OS is selected as data to be swapped out, as shown in FIG. 9.

Figure 10:
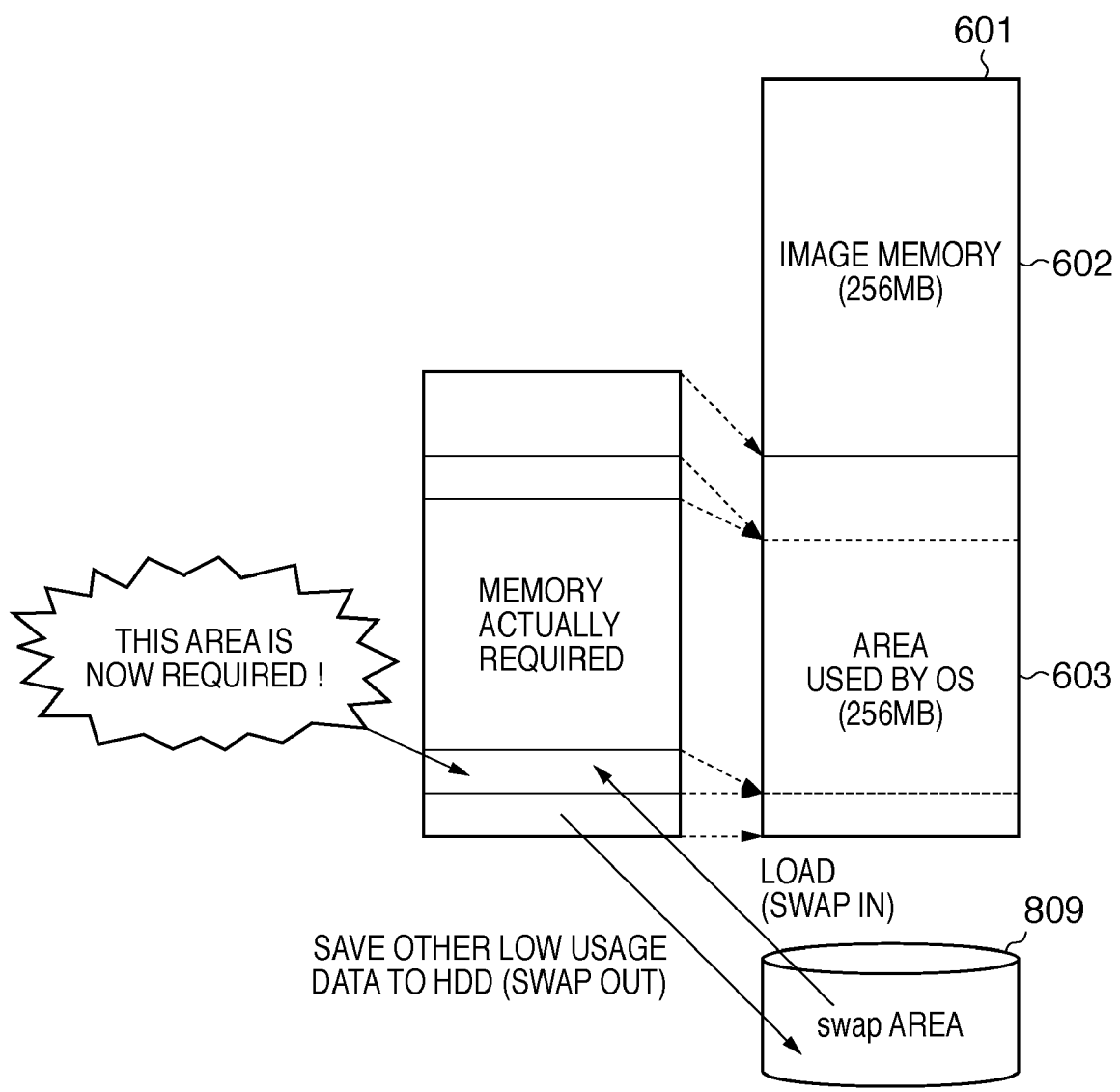
FIG. 10 illustrates swapping.

If saved data is actually required, the data is loaded from the swap partition into the volatile memory 601, as shown in FIG. 10. Further, if there is insufficient storage area in the volatile memory 601, other data is swapped out to the hard disk drive 313. Loading data from the partition 809 into the volatile memory 601 is called swapping in.

Figure 11:
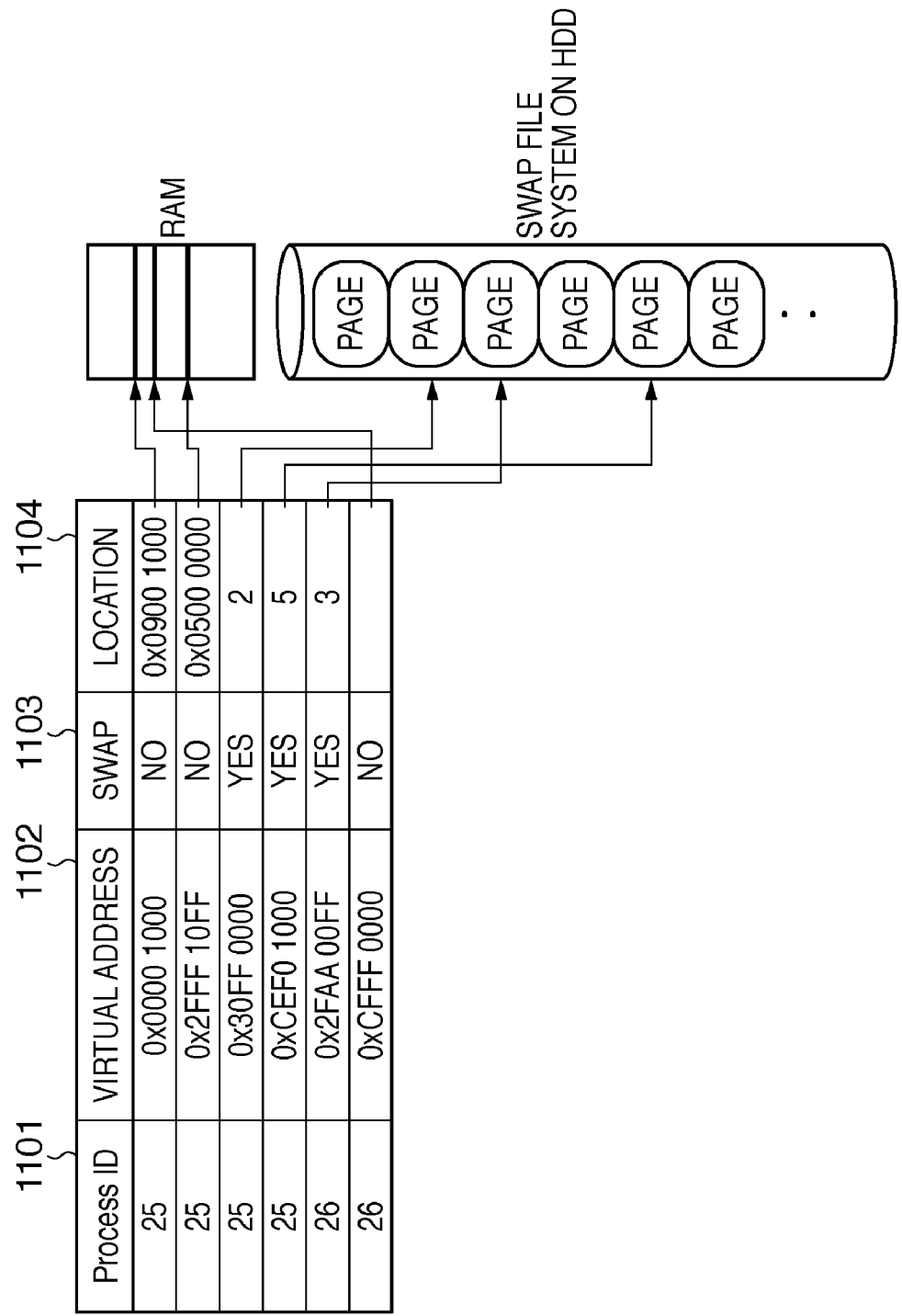
FIG. 11 illustrates a swap storage area partition 809 and a method of managing swap data.

FIG. 11 illustrates the swap storage area partition 809 and a method of managing swap data. With a general-purpose OS, applications are executed in units called processes. Processes are managed with unique numbers. Data used by each process is managed with a virtual address, and the data of a virtual address is set in the DRAM or the swap partition. In other words, the actual location of data is abstracted by the virtual addresses. In the OS, data is managed in units of fixed size. These are called pages. The OS manages data using the information of a process ID 1101, a virtual address 1102, a flag 1103 indicating whether data has been swapped, and a location 1104, as shown in FIG. 11. If the SWAP flag 1103 is NO, data is stored in the DRAM, and if YES, in the swap partition. Information on the data location in the partition 809 is managed with an index from the start of the partition 809. The fact that the data is in page units of fixed size enables the data to be managed with an index.

The swap storage area partition 809, being a storage area for saving data that will not fit into the volatile memory 601, thus differs greatly from a normal file system. Specifically, the partition 809 has no filenames, data size is fixed, and management data such as file size and location typified by ext2 and ext3 is in a memory management table in memory rather than being on the hard disk as with a general file system.

FIG. 12 shows file access points in normal operating mode and in power saving mode according to the first embodiment. As shown in FIG. 12, the hard disk drive 313 is accessed when in normal operating mode, while power supply to the hard disk drive 313 is reduced when in power saving mode. However, since the OS executed by the MFP controller 302 executes file access at an arbitrary time, data stored in the hard disk drive 313 is copied to the image memory 602 connected to the MFP controller 302, and the image memory 602 is used as a virtual hard disk device. In the case where the general-purpose OS executed on the MFP controller 302 accesses the hard disk drive 313, the actual file access point of the MFP controller 302 thereby switches from the hard disk drive 313 to the image memory 602. In other words, the MFP controller 302 functions as a recognition unit that causes the general-purpose OS executed on the MFP controller 302 to recognize the image memory 602 as a storage unit replacing the hard disk drive 313. The MFP 101 according to the present embodiment thus reduces power consumption by reducing power supply to the hard disk drive 313 while in power saving mode. However, modification of data stored in the hard disk drive 313 can be realized when in power saving mode by modifying the data copied to the image memory 602.

Figure 13:
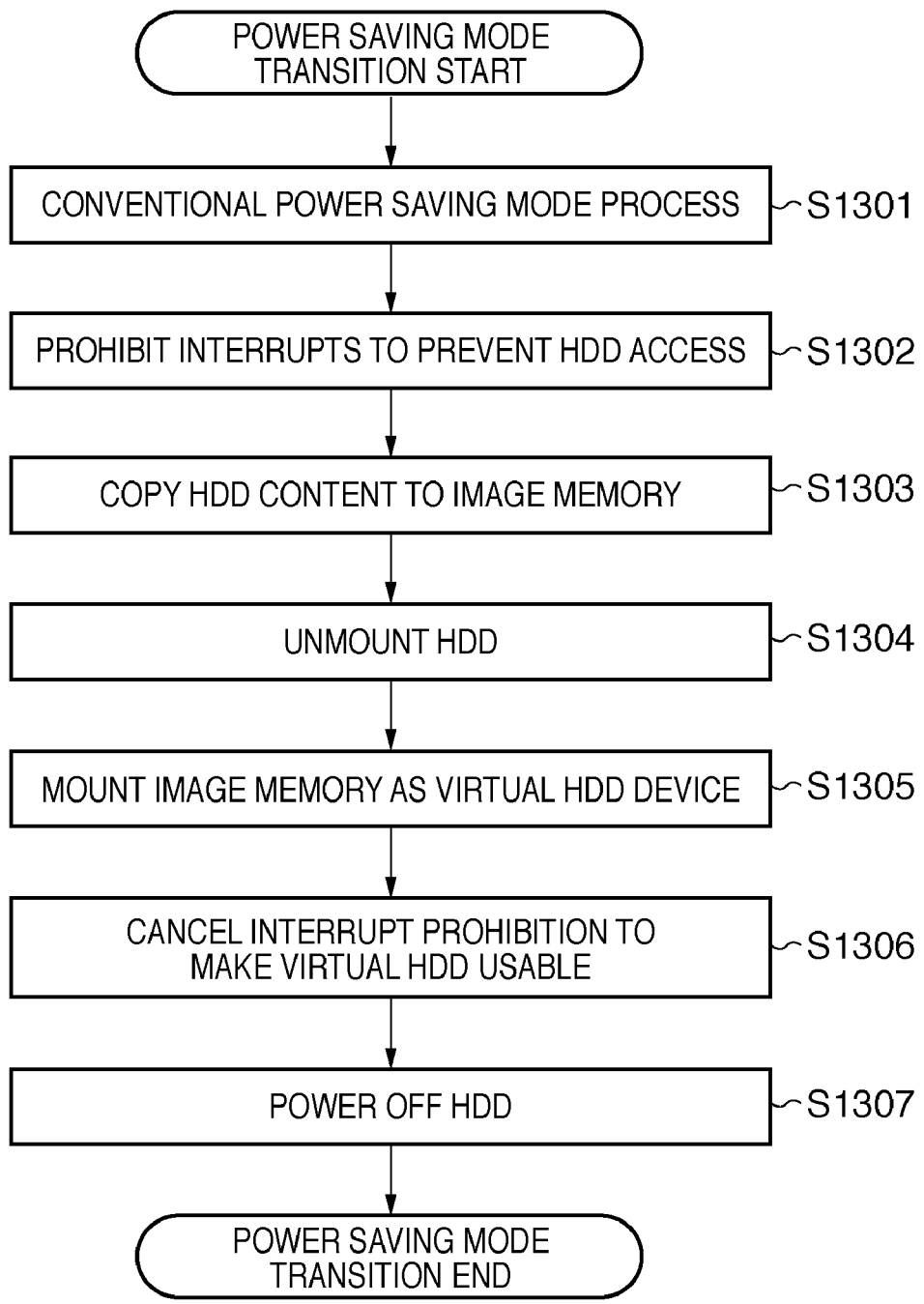
FIG. 13 is a flowchart showing a processing procedure when transitioning to power saving mode according to the first embodiment.

FIG. 13 is a flowchart showing a processing procedure when transitioning to power saving mode according to the first embodiment. The processing described hereinafter is mainly performed under the overall control of the MFP controller 302.

In step S1301, the MFP controller 302 executes a conventional power saving mode process directly after transitioning to power saving mode. Specifically, the MFP controller 302 prohibits reception of jobs and saves information that needs saving to the volatile memory 601 or the hard disk drive 313. Subsequently, in step S1302, the MFP controller 302 prohibits interrupts so that file access to the hard disk drive 313 does not occur while transitioning to power saving mode, and performs control so that processing other than the power saving mode transition process is not executed. Here, the MFP controller 302 functions as an access restriction unit.

Next, in step S1303, the MFP controller 302, functioning as a storing unit, copies data stored in the hard disk drive 313 to the image memory 602 for each partition. This copy process will be described below using FIG. 14. Subsequently, in step S1304, the MFP controller 302 performs an un-mounting process so that file access to the hard disk drive 313 by the general-purpose OS executed by the MFP controller 302 does not occur in power saving mode. The un-mounting process prevents the general-purpose OS executed on the MFP controller 302 from being able to access the hard disk drive 313.

Further, in step S1305, the MFP controller 302, functioning as a recognition unit, performs a mounting process for mounting the image memory as a virtual hard disk. The mounting process causes the general-purpose OS executed on the MFP controller 302 to recognize the image memory 602 as a storage unit replacing the hard disk drive 313. As a result of this process, the general-purpose OS will be able to recognize the image memory 602 as a storage unit replacing the hard disk drive 313. Then, in step S1306, the MFP controller 302 cancels the interrupt prohibition performed at step S1302. Finally, in step S1307, the MFP controller 302, functioning as a power control unit, reduces power supply to the hard disk drive 313, the MFP controller 303 and the devices (printer unit 315, etc.) connected to the MFP controller 303.

Figure 14:
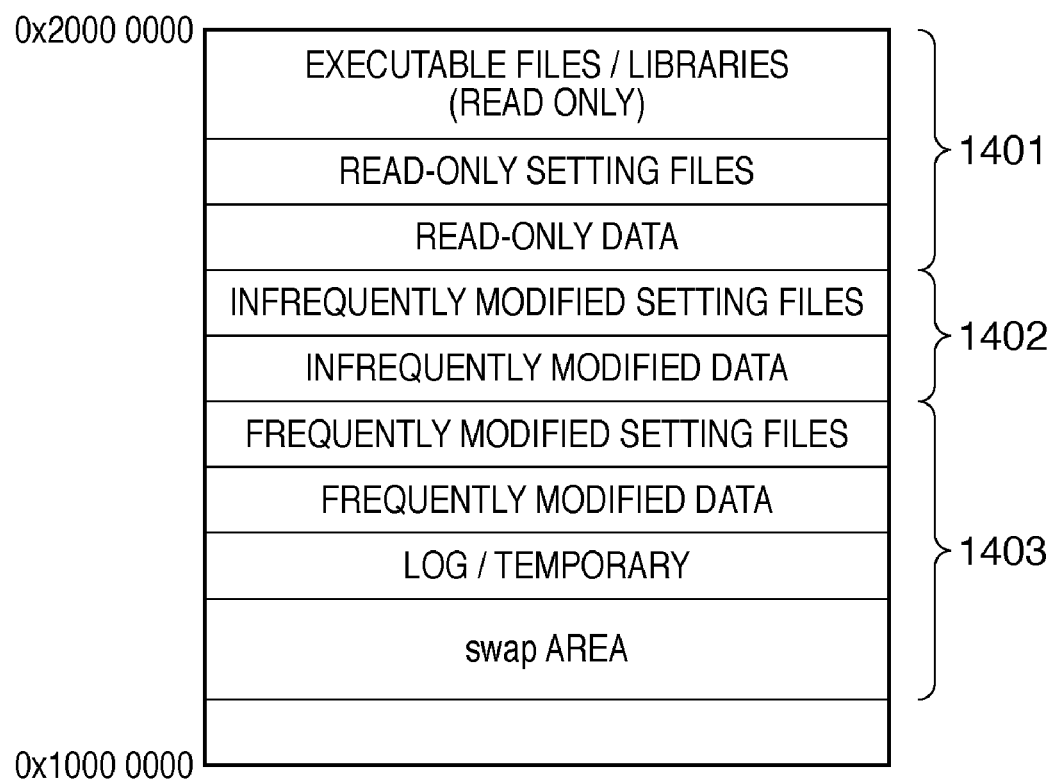
FIG. 14 shows the content of the image memory 602 to which data stored in the secondary storage unit 313 was copied according to the first embodiment.

FIG. 14 shows the content of the image memory 602 to which data stored in the hard disk drive 313 has been copied according to the first embodiment. FIG. 14 shows an area of the image memory 602 to which data stored in the hard disk drive 313 was copied at step S1303 of FIG. 13. As shown in FIG. 8, the partitions divided in advance are disposed in order of read-only setting files 1401, unlikely to be modified files 1402, and likely to be modified files and swap storage area 1403 from a high-order address of the image memory 602.

Figure 15:
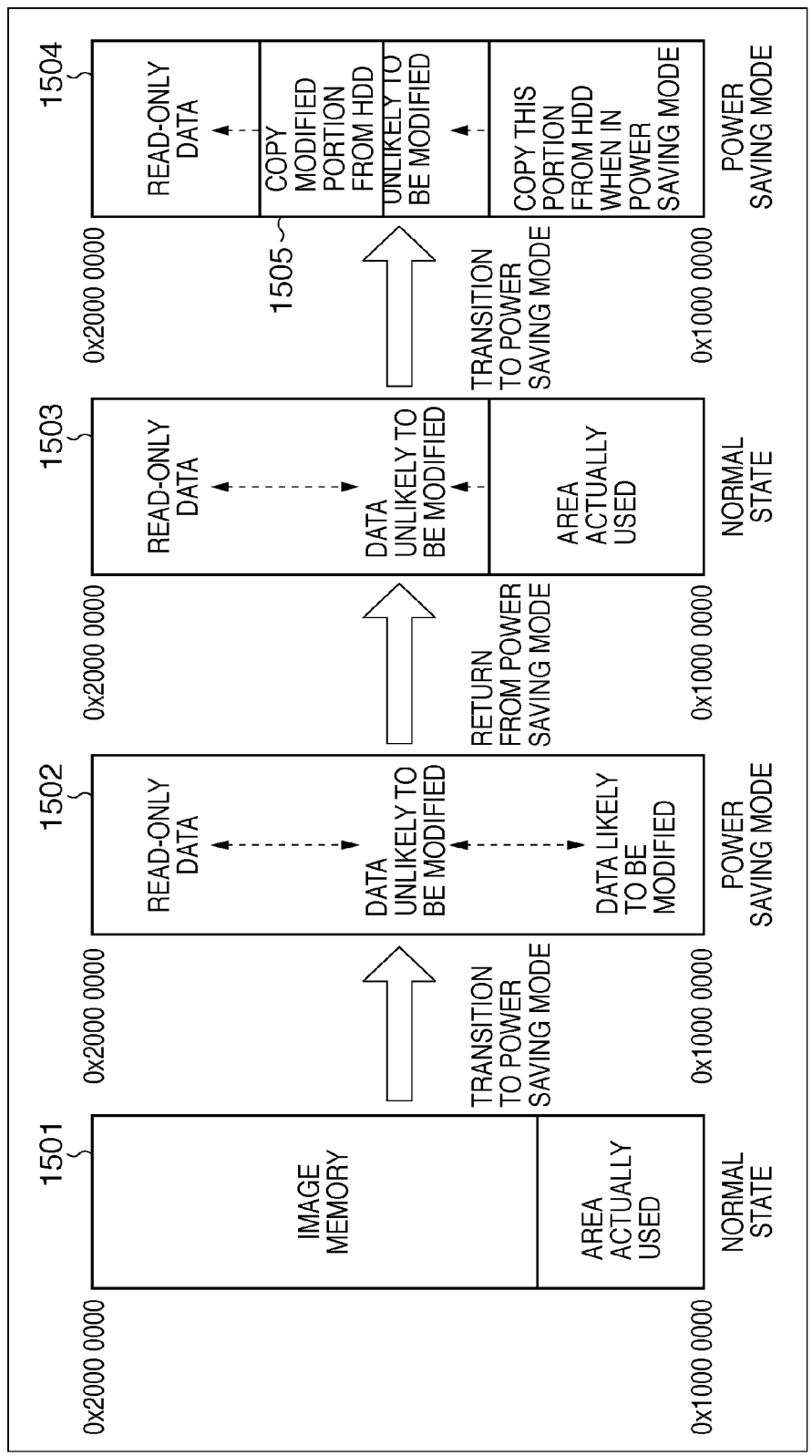
FIG. 15 illustrates a copy procedure when in power saving mode according to the first embodiment.

The reason for thus disposing the partitions will be described using FIG. 15. FIG. 15 illustrates a copy procedure when in power saving mode according to the first embodiment. In FIG. 15, reference numerals 1501 and 1503 denote data stored in the image memory 602 when in normal operating mode, while reference numerals 1502 and 1504 denote data stored in the image memory 602 when in power saving mode.

When transitioning again to the power saving mode of 1504 after having returned from power saving mode in 1503, the file 1505 which has been updated in the interim needs to again be copied to the image memory 602, while the previously copied files of files that have not been updated may still be used. Thus, only portions of the memory area that have been modified in normal operating mode need be updated, without needing to update the entire memory area every time.

Further, as illustrated in FIG. 7, the image memory 602 is basically used from a high-order address, and the area used as an image memory will also need to be copied. In view of this, in the present embodiment, read-only data, being easier to handle, is disposed in high-order addresses which are less suitable for use as the image memory 602, while data that is likely to be modified and the swap storage area, being more difficult to handle, are disposed in lower-order addresses.

Figure 16:
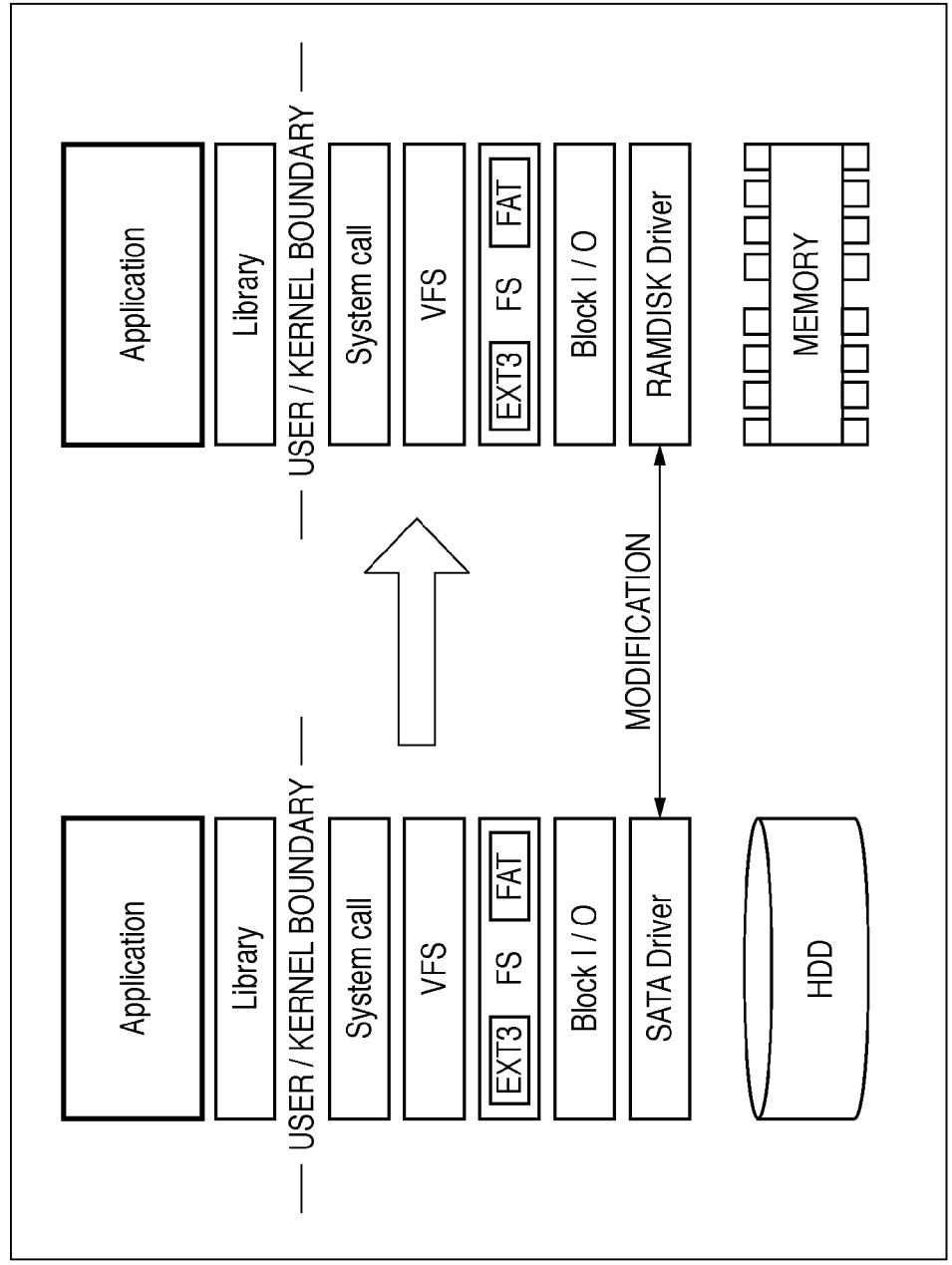
FIG. 16 illustrates a process of switching the file access target according to the first embodiment.

FIG. 16 illustrates a process of switching the file access target according to the first embodiment. In FIG. 16, the process of switching the file access target from the hard disk drive 313 to the image memory 602 performed in S1304 and S1305 of FIG. 13 is illustrated.

Applications operating on the general-purpose OS executed by the MFP controller 302 use the services of the OS via libraries. A library uses services in a kernel via system calls. In the case of a file access, a system call uses a library on a virtual file system (VFS) layer that absorbs differences between file systems (file formats). The VFS uses the library of each file system, and the input/output of all file systems is scheduled using a Block I/O layer. On the bottom layer is the device driver, which in the case of a hard disk is an IDE driver, a Serial ATA driver or the like. When changing the I/O destination to the image memory 602, the device driver is changed to a RAM disk driver.

Figure 17:
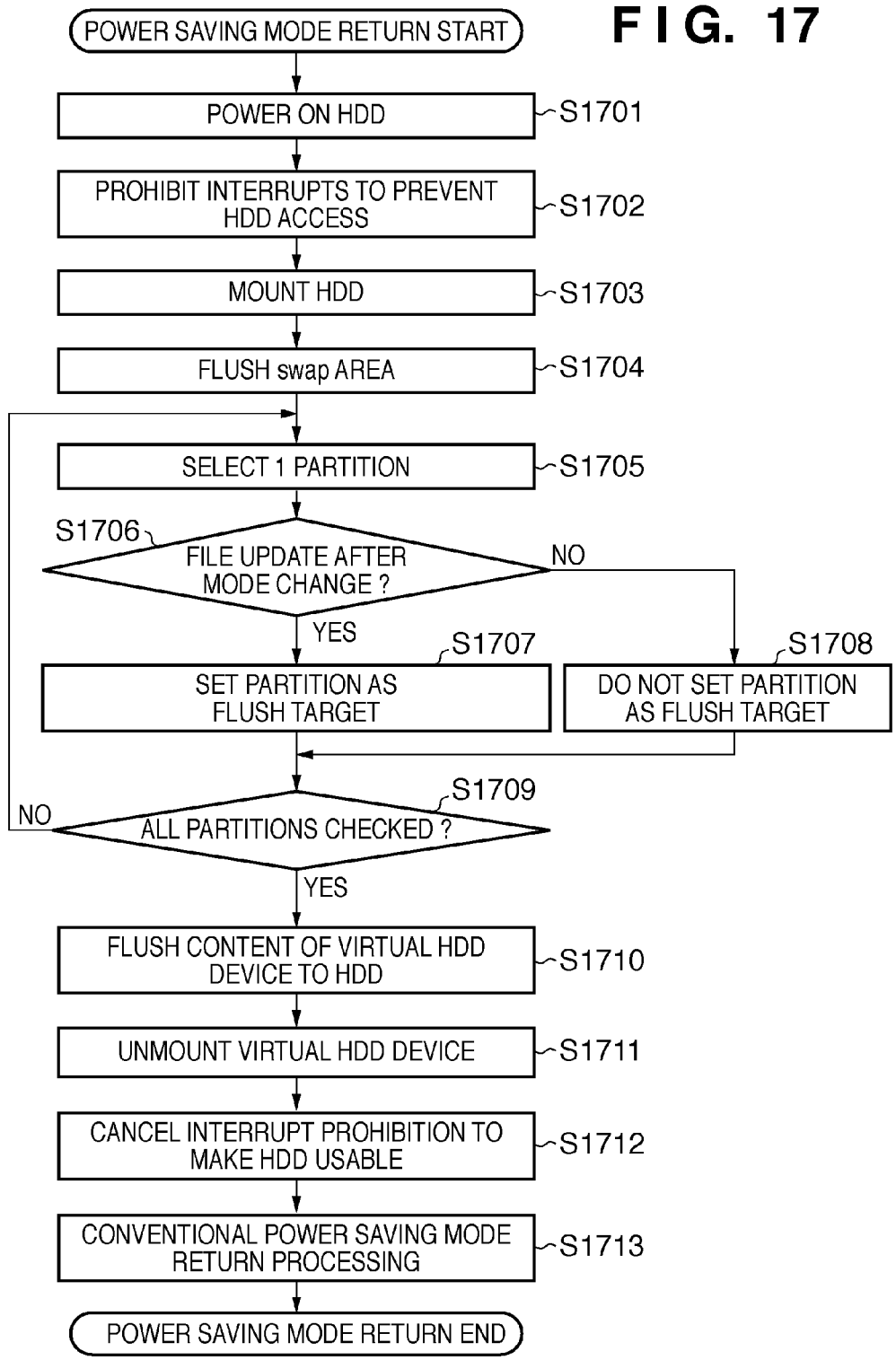
FIG. 17 is a flowchart showing a processing procedure when returning from power saving mode according to the first embodiment.

FIG. 17 is a flowchart showing a processing procedure when returning from power saving mode according to the first embodiment. The processing described hereinafter is mainly performed under the overall control of the MFP controller 302.

First, in step S1701, the MFP controller 302 powers on the hard disk drive 313, the MFP controller 303 and the devices (printer unit 315, etc.) connected to the MFP controller 303. Subsequently, in step S1702, the MFP controller 302 prohibits interrupts so that file access to the hard disk drive 313 does not occur while returning from power saving mode, and performs control so that processing other than the power saving mode return process is not executed.

Next, in step S1703, the MFP controller 302 mounts the hard disk drive 313 to enable the OS to use the hard disk drive 313. Subsequently, in step S1704, the MFP controller 302 flushes all of the data in the swap storage area partition 809, since update date and time management of files in the partition 809 was not performed. Here, flushing refers to updating data stored in the hard disk drive 313 with data stored in the image memory 602.

Next, in step S1706, the MFP controller 302 selects the partitions shown in FIG. 14, one at a time. Further, in step S1706, the MFP controller 302 determines whether a file has been updated while in power saving mode. If a file has been updated, the MFP controller 302 shifts processing to S1707 and sets the partition in which the file was updated as a flush target, and if a file has not been updated, the MFP controller 302 shifts processing to S1708 and does not set the partition as a flush target.

Next, in step S1709, the MFP controller 302 determines whether all of the partitions have been checked. When it is determined that all of the partitions have been checked, the MFP controller 302 shifts processing to S1710. When it is all of the partitions have not been checked, the MFP controller 302 shifts processing to S1705.

In step S1710, the MFP controller 302 writes partitions set as flush targets back to the hard disk drive 313. In the above processing of steps S1705 to S1710, the MFP controller 302 functions as an update unit.

Subsequently, in step S1711, the MFP controller 302 executes a process of un-mounting the image memory 602, since the image memory 602 is no longer used as a storage unit after the flushing process. Further, in step S1712, the MFP controller 302 cancels the interrupt prohibition (file access regulation) performed at step S1702. Finally, in step S1713, the MFP controller 302 executes a conventional power saving mode return process that includes initializing the MFP controller 303 and the devices connected to the MFP controller 303, and setting saved register information.

Thus, in the present embodiment, control for flushing (updating) data stored in the image memory 602 to the hard disk drive 313 in one go was described. However, since updating in partition units is also possible, flushing of the hard disk drive 313, mounting of the hard disk drive 313 and un-mounting of the image memory 602 may be performed at the time at which partitions are actually used as the image memory 602, rather than performing the processing of S1710. Return time from power saving mode is further reduced by performing such control.

Figure 18:
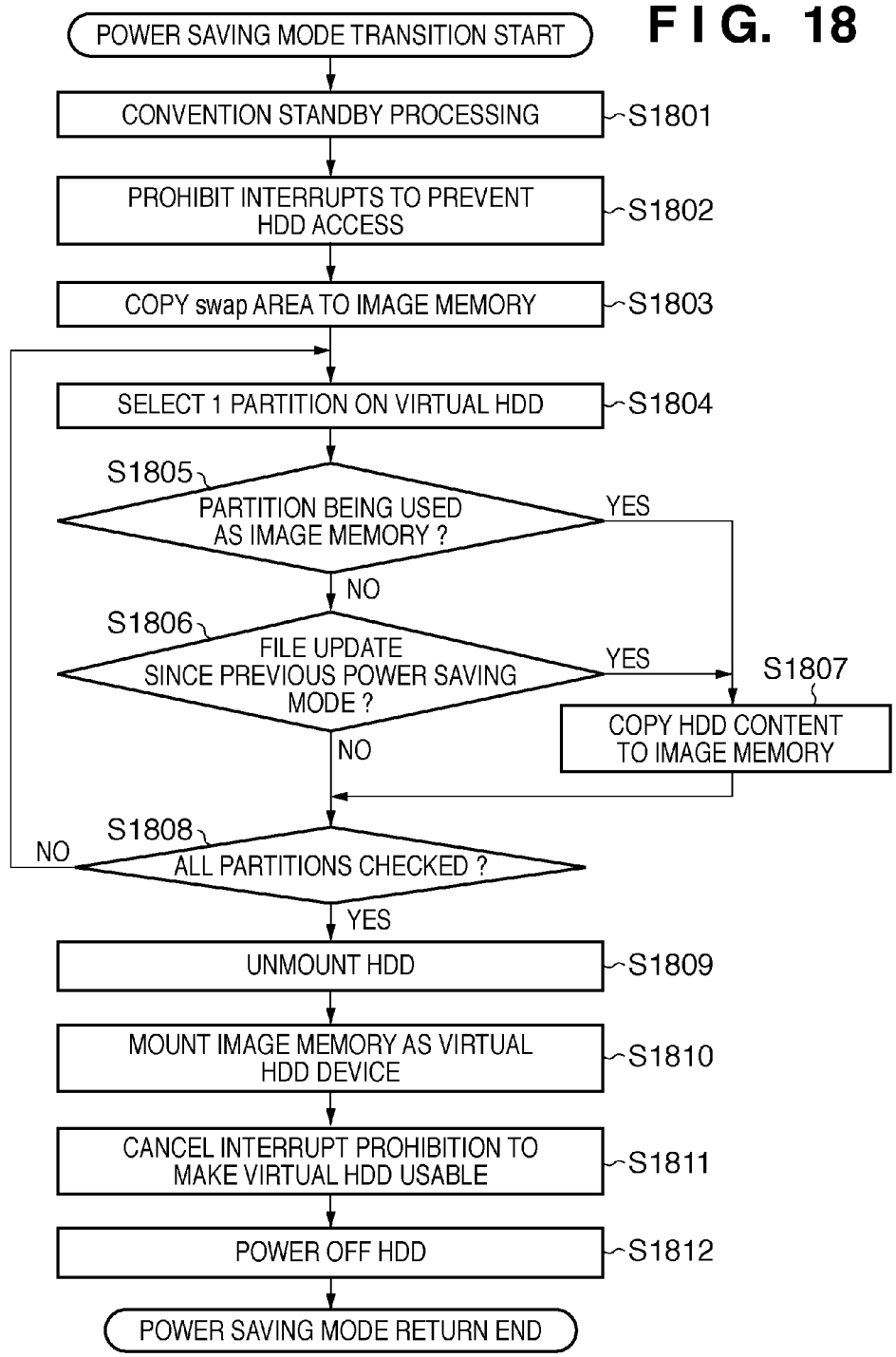
FIG. 18 is a flowchart showing a processing procedure for transitioning to power saving mode from the second time onwards according to the first embodiment.

FIG. 18 is a flowchart showing a processing procedure for transitioning to power saving mode from the second time onwards according to the first embodiment. The processing described hereinafter is mainly performed under the overall control of the MFP controller 302. The processing described hereinafter differs from the first power saving mode transition process, since there are partitions that have been copied to the image memory 602 as a result of the previous power saving mode process.

In step S1801, the MFP controller 302, similar to the processing of S1301, prohibits reception of jobs and saves information that needs saving to the volatile memory 601 or the hard disk drive 313. Subsequently, in step S1802, the MFP controller 302 prohibits interrupts so that file access to the hard disk drive 313 does not occur while transitioning to power saving mode, and performs control so that processing other than the power saving mode transition process is not executed. In step S1803, the MFP controller 302 copies data stored in the swap storage area to the image memory 602 for each partition. This is because the swap storage area differs from normal files and the entire area needs to be copied.

Next, in step S1804, the MFP controller 302 selects one of the partitions in the image memory 602, which functions as a storage unit. Further, in step S1805, the MFP controller 302 determines whether the partition selected in S1804 was used as the image memory 602. This determination is performed by comparing the peak usage value illustrated in FIG. 7 with the partition table shown in FIG. 14. If the selected partition has been used as the image memory 602, the MFP controller 302 again copies the partition from the hard disk drive 313 to the image memory 602, and shifts processing to step S1808.

If the selected partition has not been used as the image memory 602, the MFP controller 302 shifts processing to step S1806. Next, in step S1806, the MFP controller 302 determines whether a file has been updated since the previous power saving mode. If a file has been updated, the MFP controller 302 shifts processing to step S1807, and copies the partition selected in S1804 from the hard disk drive 313 to the image memory 602.

In step S1808, the MFP controller 302 determines whether all of the partitions have been checked. When it is determined that at least one of the partitions has not been checked, the MFP controller 302 returns processing to S1804. When it is determined that all of the partitions have been checked, the MFP controller 302 shifts processing to S1809.

In step S1809, the MFP controller 302 executes an unmounting process so that the hard disk drive 313 is not used. Subsequently, in step S1810, the MFP controller 302 mounts the image memory 602 as a virtual hard disk replacing the hard disk drive 313. Then, in step S1811, the MFP controller 302 cancels the interrupt prohibition performed in S1802. Finally, in step S1812, the MFP controller 302 reduces power supply to the hard disk drive 313, the MFP controller 303, and the devices connected to the MFP controller 303.

As described above, in the present embodiment, an example was given in the processing of the flowcharts of FIGS. 17 and 18 in which copying and flushing are executed in partition units.

As described above, an information processing apparatus (MFP 101) according to the present embodiment stores data in a nonvolatile memory that may possibly be used in power saving mode to a volatile memory to which power will still be supplied in power saving mode. Further, the information processing apparatus causes the operating system to recognize the storage area storing the data as a replacement for the nonvolatile memory. Even in the case where access to the nonvolatile memory occurs as a result of an interrupt from an external device, the general-purpose OS or the like, the information processing apparatus is able to deal with the interrupt by using the data temporarily stored in the volatile memory, without supplying power to the nonvolatile memory. Therefore, the information processing apparatus is able to suitably reduce power consumption during power saving mode, as well as being able to deal with an access to the nonvolatile memory resulting from an interrupt or the like.

Note that the present invention is not limited to the above embodiment and can be variously modified. For example, the information processing apparatus may update content modified while in power saving mode to the nonvolatile memory, when transitioning from power saving mode to normal operating mode. Substantially the same functions as functions that can be realized in a state where power is supplied to the nonvolatile memory can thereby be provided while in power saving mode. Also, the processing load can be reduced by updating only modified data, as noted above.

In the present embodiment, it is possible, in the process of transitioning to power saving mode from the second time onwards, for the information processing apparatus to store only data modified in the prior normal operating mode to the volatile memory, out of data stored in the previous power saving mode transition process. The processing load of the information processing apparatus in the process of transitioning to power saving mode from the second time onwards can thereby be reduced.

Figure 19:
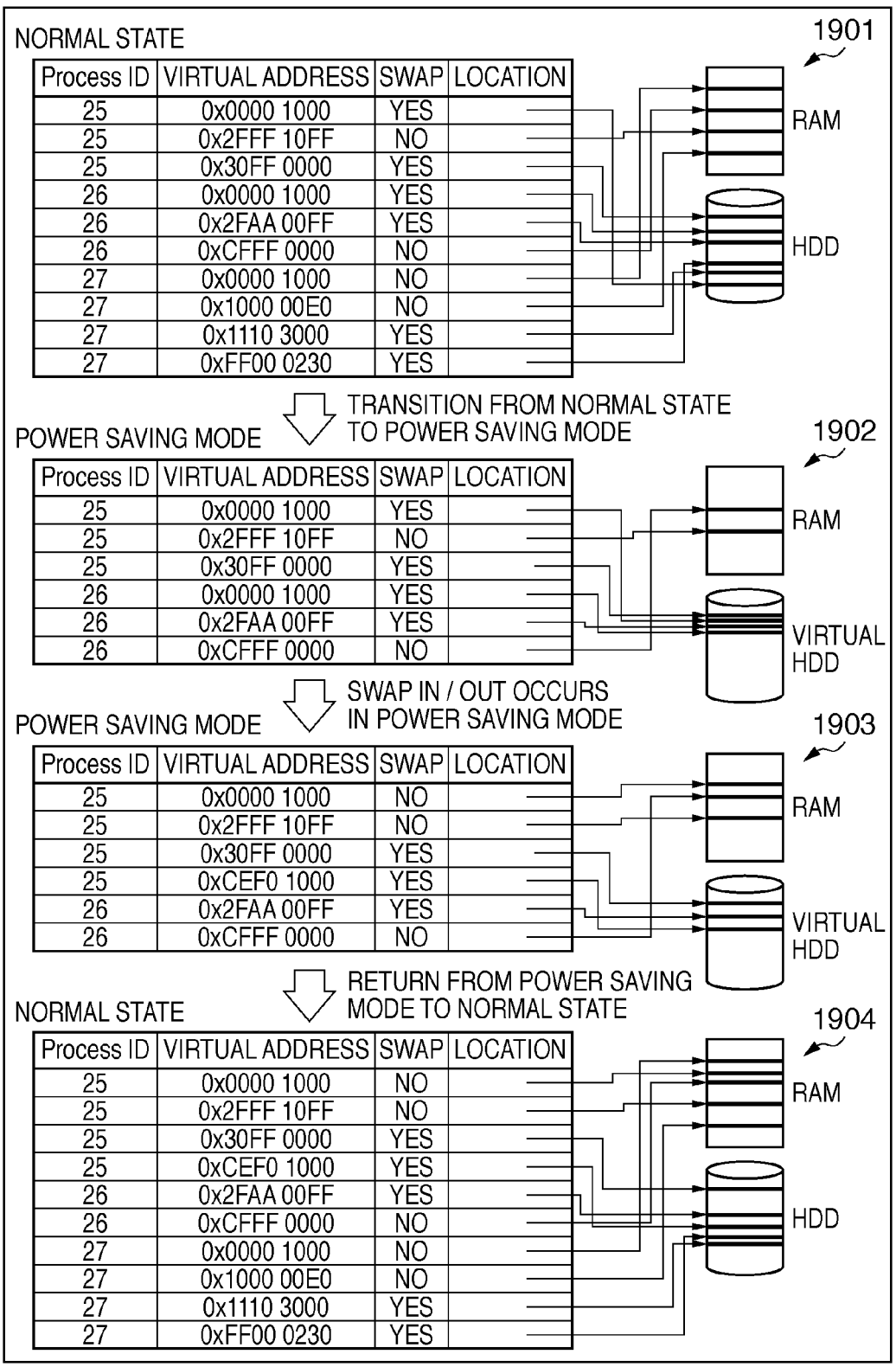
FIG. 19 illustrates a memory management table according to a second embodiment.

Next, a second embodiment will be described with reference to FIGS. 19 to 21. A swap file system is different in character to other file systems, as noted above using FIGS. 9 to 11. In the first embodiment, the entire swap storage area was thus copied and flushed. In the present embodiment, a method of reducing the volume of copying and flushing between the hard disk drive 313 and the virtual hard disk even for the swap storage area will be described.

First, a method of reducing the volume of copying and flushing in the swap storage area will be described with reference to FIG. 19. FIG. 19 illustrates a memory management table according to the second embodiment. The memory management table shown in FIG. 19 is managed by the OS illustrated in FIG. 11.

Reference numeral 1901 denotes the memory management table in a normal state (normal operating mode). Reference numeral 1902 denotes the memory management table after transitioning to power saving mode. Reference numeral 1903 denotes the memory management table in the case where a swap in/out has occurred in power saving mode. Reference numeral 1904 denotes the memory management table after having transitioned from power saving mode to normal operating mode. Here, three processes (process IDs: 25, 26, 27) are given as an example, with the process IDs of the processes required in power saving mode being 25 and 26.

When transitioning to power saving mode, the MFP controller 302 first saves the pre-transition memory management table 1901. Control is performed so that processes not required when in power saving mode are removed from scheduling. The OS is notified in advance as to which processes will be operable when in power saving mode. As a result, the table shown in FIG. 20 is generated. FIG. 20 shows operating processes when in power saving mode according to the second embodiment.

Consequently, the MFP controller 302, with reference to the table shown in FIG. 20, extracts from the swap area only the data of processes that will be operable when in power saving mode, based on information in the memory management table 1901, and stores the extracted data in the virtual hard disk. Here, the MFP controller 302 updates the location data of rows in the memory management table 1901 in which SWAP is YES. The memory management table 1902 is generated as a result of this processing.

It is assumed that swapping in/out is then executed in power saving mode, and the memory management table 1903 is generated.

When returning from power saving mode, the management table does not need to be rewritten for data in RAM. On the other hand, for swapped data, when returning data from the virtual hard disk to the hard disk drive 313, data needs to be returned while comparing the memory management table 1903 with the saved memory management table 1901 so as to maintain consistency. If the swap data of the process IDs 25 and 26 are swapped in and thus disappear from the swap storage area while in power saving mode, this swap data is deleted from the swap partition. If new swap data is generated while in power saving mode, a swap processing routine of the OS is operated and the new swap data is added to the swap storage area. The memory management table 1904 is generated as a result of this processing.

Next, another method of reducing the volume of copying and flushing in the swap partition that differs from the method shown in FIG. 19 will be described with reference to FIG. 21. FIG. 21 shows a variation of the second embodiment. First, processes that will be operable and processes that are not operable when in power saving mode are notified in advance to the OS as shown in FIG. 20. Subsequently, as shown in FIG. 21, the swap partition is divided into a swap partition for processes that will be operable when in power saving mode and a swap partition for processes that will not be operable when in power saving mode. Directly after transitioning to power saving mode, control is performed to remove processes not required when in power saving mode from scheduling, and to copy and flush only the former swap partition to the image memory 602. While the volume of copying and flushing increases in comparison to FIG. 19, the calculations for rewriting the memory management table can be omitted. Thus, the method of FIG. 19 is effective if there is not much data to be swapped, while the method of FIG. 21 is effective if there is a large amount of data to be swapped.

Next, a third embodiment will be described with reference to FIGS. 22 to 29. In the present embodiment, which is a variation of the first and second embodiments, operations in the case where data stored on the hard disk drive 313 is accessed in power saving mode will be described.

Figure 22:
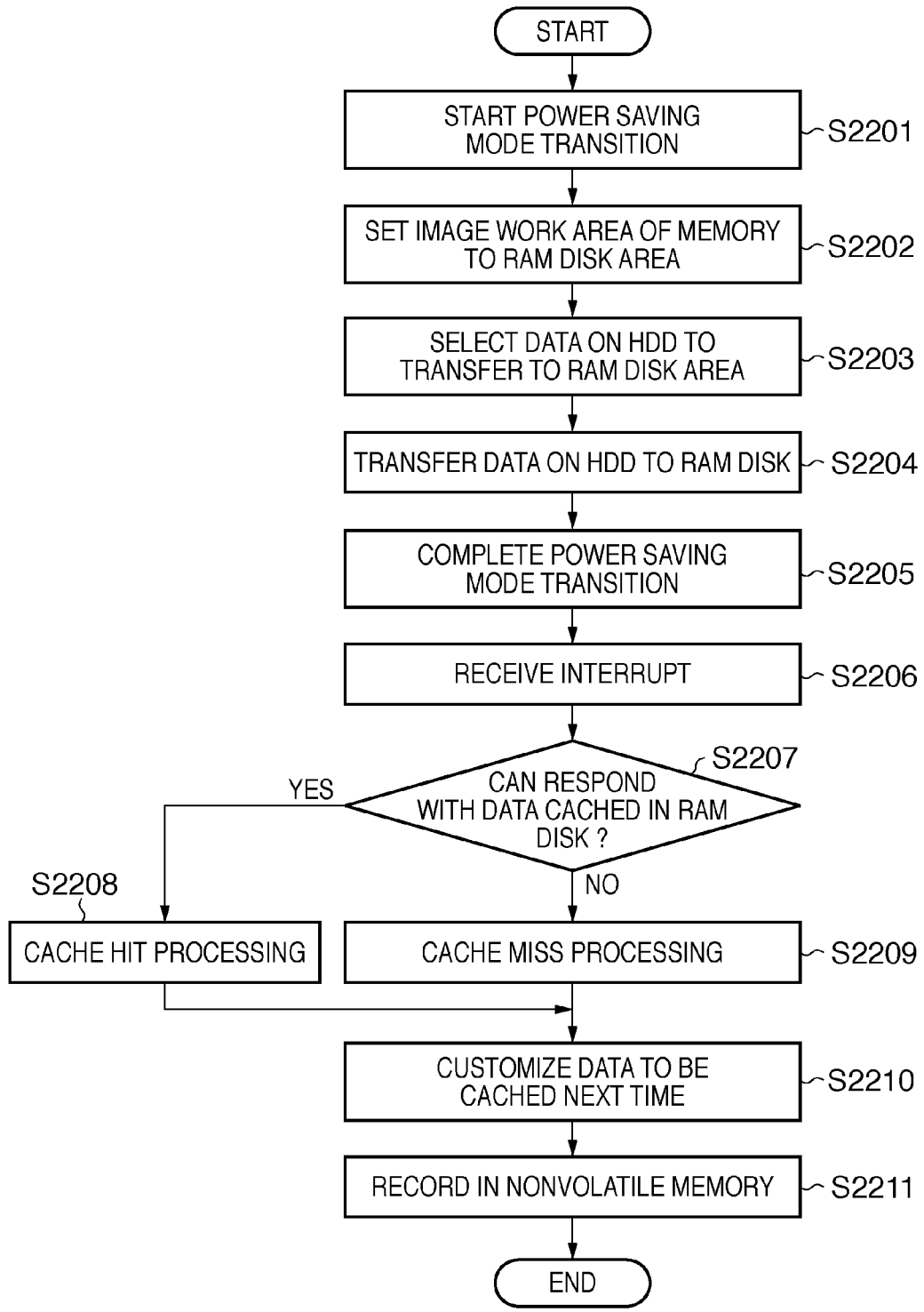
FIG. 22 is a flowchart showing a processing procedure for transitioning to power saving mode according to a third embodiment.

FIG. 22 is a flowchart showing a processing procedure for transitioning to power saving mode according to the third embodiment. The processing described hereinafter is mainly performed under the overall control of the MFP controller 302. According to the present embodiment, an image work area of memory is used as a RAM disk when transitioning to power saving mode, and data on the hard disk drive 313 is transferred to the RAM disk area. Further, if data on the hard disk drive 313 is required as a result of an interrupt from a network or the like, supplying power to the hard disk drive 313 is made unnecessary by accessing the data transferred to the RAM disk.

First, in step S2201, the MFP 101 starts the process of transitioning to power saving mode in accordance with a factor such as a timer or a user instruction. Once the MFP 101 has transitioned to power saving mode, there will be areas of the main storage device such as the image work area that are not being used. In step S2202, the MFP controller 302 sets such an area to RAM disk. Subsequently, in step S2203, the MFP controller 302 selects data on the hard disk drive 313 to transfer to the RAM disk. Further, in step S2204, the MFP controller 302 transfers the selected data to the RAM disk.

Once the transition to power saving mode is completed, the MFP 101, in step S2205, enters power saving mode. In the MFP 101, at this time, power is being supplied to the main storage device but not to the hard disk drive 313.

Next, in step S2206, the MFP 101 receives an interrupt via the network. The MFP 101 thus receives various interrupts even while in power saving mode. Depending on the interrupt, it may be possible to respond by only accessing data on the hard disk drive 313 that has been transferred to the RAM disk in S2204, or data on the hard disk drive 313 that has not been transferred to the RAM disk may be required depending on the environment and usage of the user. In view of this, in step S2207, the MFP controller 302 determines whether it is possible to deal with the interrupt with only data that has been transferred to the RAM disk.

If it is determined that it is possible to respond by only accessing data on the hard disk drive 313 that has been transferred to the RAM disk, the MFP controller 302 shifts processing to S2208, and executes processing for a cache hit. If data on the hard disk drive 313 that was not transferred to the RAM disk is required, the MFP controller 302 shifts processing to S2209, and executes processing for a cache miss.

Next, in step S2210, the MFP controller 302 customizes the data on the hard disk drive 313 to be transferred to the RAM disk when next transitioning to power saving mode, and records the customized data to the nonvolatile memory in step S2211. Thus, in the present embodiment, data on the hard disk drive 313 to be transferred to RAM disk when in power saving mode can be optimized according to the environment and usage of the user as a result of the processing of S2210.

Next, a process of setting a portion of the area of the main storage device to RAM disk, and a process of transferring data on the hard disk drive 313 to the RAM disk area will be described with reference to FIG. 23. FIG. 23 shows the content of memory in the MFP 101 according to the third embodiment.

In FIG. 23, reference numeral 2301 denotes the memory of the MFP 101 when in normal operating mode. Reference numeral 2302 denotes the memory of the MFP 101 when in power saving mode. The memory 2301 in normal operating mode includes an image work area (image memory) 2311, a user stack area 2312, a user heap area 2313, and an OS heap area 2314. The memory 2302 in power saving mode includes a RAM disk area 2321, the user stack area 2312, the user heap area 2313, and the OS heap area 2314.

In the MFP 101 during power saving mode, copying, printing and the like are not performed, so the image work area 2311 used for those purposes will not be accessed. In view of this, the image work area 2311 is set as the RAM disk area 2321 when transitioning to power saving mode, and data on the hard disk drive 313 is transferred thereto. The user stack area 2312, the user heap area 2313 and the OS heap area 2314, which need to hold data even while in power saving mode, are used as they were when in normal operating mode and are not set to RAM disk.

Next, a process of selecting data to be transferred based on the access frequency of data recorded on nonvolatile memory will be described with reference to FIG. 24. FIG. 24 shows a transfer data selection table 2400 for selecting data to be transferred to the RAM disk area 2321 according to the third embodiment.

When the MFP 101 in normal operating mode transitions to power saving mode, the MFP controller 302 transfers data on the hard disk drive 313 to the RAM disk area 2321, as illustrated using FIG. 23. Specifically, the MFP controller 302, when selecting transfer data, uses the transfer data selection table 2400, which is for selecting data stored on nonvolatile memory such as SRAM. The nonvolatile memory in which the transfer data selection table 2400 is stored functions as a data selection storage unit.

In the transfer data selection table 2400, a number 2401 has been appended to each transfer data candidate, and information capable of uniquely specifying transfer data candidates is defined. Reference numeral 2402 denotes the start address of transfer data candidates on the hard disk drive 313. Reference numeral 2403 denotes the size from the start address 2402. The MFP controller 302 is able to specify data on hard disk drive 313 based on the start address 2402 and the size 2403, and determines and selects data to be transferred to the RAM disk area 2321 using an access frequency 2404. That is, the access frequency 2404 determines a priority order when transferring data.

Next, a process of updating the access frequency of data in the nonvolatile memory that has been transferred to the RAM disk area 2321 will be described with reference to FIGS. 24 and 25. FIG. 25 is a flowchart showing a processing procedure in the case where a request to read data on the hard disk drive 313 occurs while in power saving mode according to the third embodiment. Note that the processing described hereinafter is mainly performed under the overall control of the MFP controller 302.

If a request to read data on the hard disk occurs as the result of an external interrupt while in power saving mode, the MFP controller 302, in step S2501, determines whether the data is cached in the RAM disk area 2321. Here, the MFP controller 302 shifts processing to step S2502 if the data is cached in the RAM disk area 2321, and reads the RAM disk area 2321 without powering on the hard disk drive 313. Then, in step S2509, the MFP controller 302 updates the access frequency 2404 in the transfer data selection table 2400, and ends processing of the read request.

If it is determined in S2501 that the data is not cached in the RAM disk area 2321, that is, if access has occurred with respect to data other than stored data, the MFP controller 302 shifts processing to S2503. In step S2503, the MFP controller 302 supplies power to the hard disk drive 313. Then, having waited for the hard disk drive 313 to spin up, the MFP controller 302, in step S2504, reads the data from the hard disk drive 313. Here, it is anticipated that the read-requested data will also be required hereafter when in power saving mode.

In view of this, the MFP controller 302, in step S2505, checks the free space in the RAM disk area 2321. Further, in step S2506, the MFP controller 302 compares the free space of the RAM disk area 2321 checked in S2505 with the data size read in S2504. The MFP controller 302 shifts processing to S2508 if the free space of the RAM disk area 2321 is greater than or equal to the read data size. If the free space is less than the read data size, the MFP controller 302 shifts processing to S2507, and discards low usage data out of the data cached in the RAM disk area 2321. An area for storing the read data is thereby secured. Then, processing shifts to S2508.

In step S2508, the MFP controller 302 caches the data read from the hard disk drive 313 in S2504 to the RAM disk area 2321. Subsequently, in step S2509, the MFP controller 302, functioning as a modification unit, updates the access frequency 2404 of the transfer data selection table 2400, and ends processing of the read request.

Figure 26:
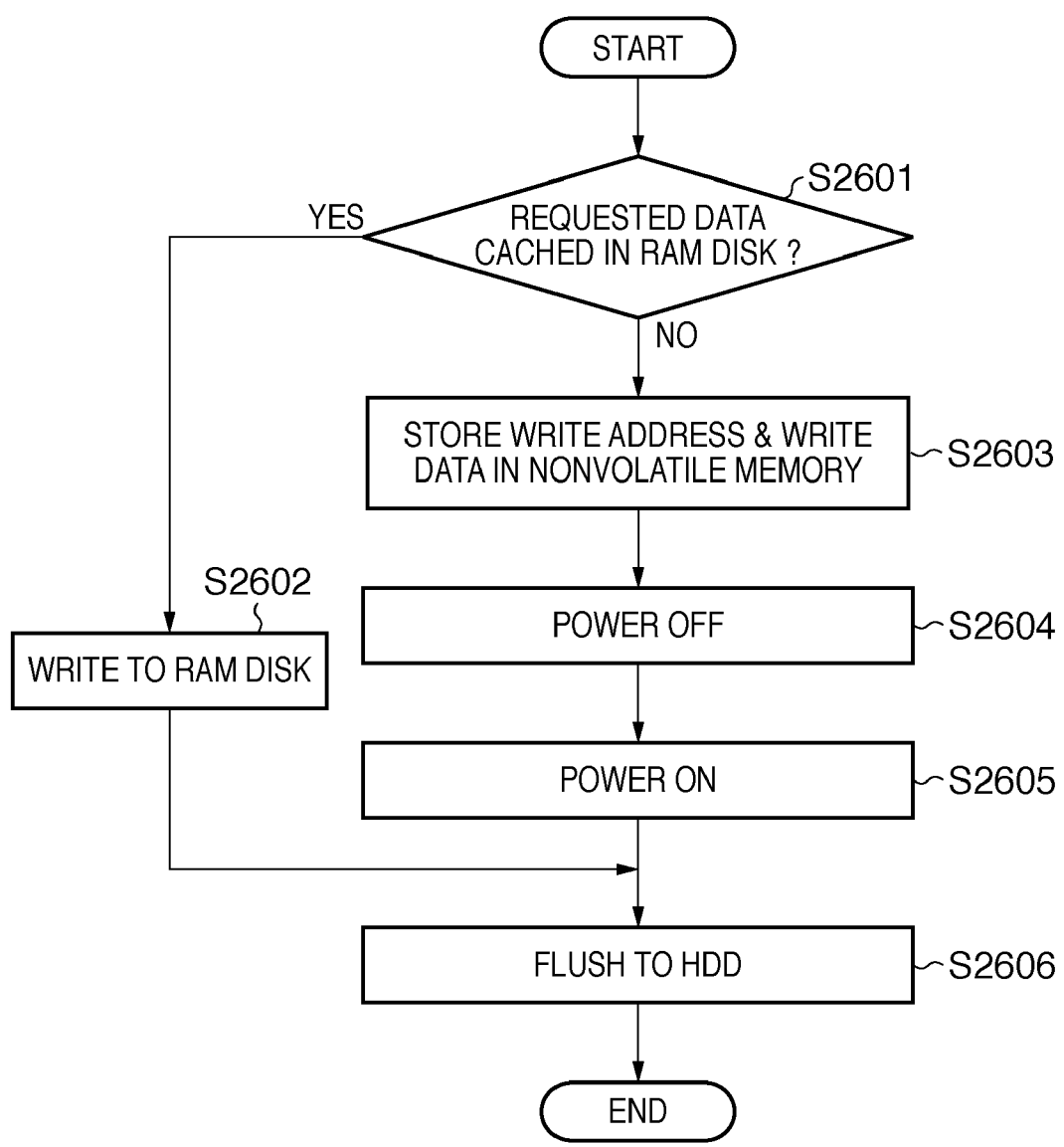
FIG. 26 is a flowchart showing a processing procedure in the case where a request to write data to the secondary storage unit 313 occurs while in power saving mode according to the third embodiment.

Next, processing in the case where a write request is received in power saving mode will be described with reference to FIGS. 26 to 28. FIG. 26 is a flowchart showing a processing procedure in the case where a request to write data to the hard disk drive 313 occurs while in power saving mode according to the third embodiment. FIG. 27 shows an update table 2700 stored in nonvolatile memory according to the third embodiment. Note that the processing described hereinafter is mainly performed under the overall control of the MFP controller 302.

When a request to write data stored on the hard disk drive 313 occurs while in power saving mode, the MFP controller 302, in step S2601, determines whether the data is cached in the RAM disk area 2321. Here, if the data to be written is cached in the RAM disk area 2321, the MFP controller 302 shifts processing to step S2602, and writes the data to the RAM disk area 2321. Then, after transitioning to normal operating mode, the MFP controller 302, in step S2606, writes the data to the hard disk drive 313.

If it is determined in step S2601 that the data to be written is not cached in the RAM disk area 2321, that is, if an access has occurred with respect to data other than stored data, the MFP controller 302 shifts processing to step S2603. In step S2603, the MFP controller 302 stores a write address 2702 on the hard disk drive 313 and write data 2703 to be written, as shown in FIG. 27, to nonvolatile memory, without supplying power to the hard disk drive 313. FIG. 27 shows the update table 2700 stored in nonvolatile memory according to the third embodiment. The update table 2700 includes a write data number 2701, a write address 2702, and write data 2703. Data stored in the update table 2700 while in power saving mode is used if the operating mode of the MFP 101 changes, and stored in the hard disk drive 313. The nonvolatile memory in which the update table 2700 is stored functions as an update information storage unit.

When the MFP 101 is powered off from power saving mode at step S2604 and powered on at step S2605, the MFP controller 302, in step S2606, updates the content of the hard disk drive 313 based on the data stored in the update table 2700.

FIG. 28 is a flowchart showing a variation of FIG. 26. Here, the same numerals are attached to processing that overlaps with FIG. 26, and description thereof will be omitted herein. That is, description of steps S2601, S2602, S2603 and S2605 will be omitted herein. Note that with the flowchart shown in FIG. 26, it is assumed that the MFP 101 is powered off and powered on after the processing of step S2603. With the flowchart shown in FIG. 28, it is assumed that the operating mode of the MFP 101 transitions from power saving mode to normal operating mode after the processing of S2603.

When the operating mode of the MFP 101 transitions from power saving mode to normal operating mode in step S2801, the MFP controller 302 shifts processing to S2606. Here, the MFP controller 302 updates the content of the hard disk drive 313, based on data in the update table 2700 that was saved while in power saving mode.

Figure 29:
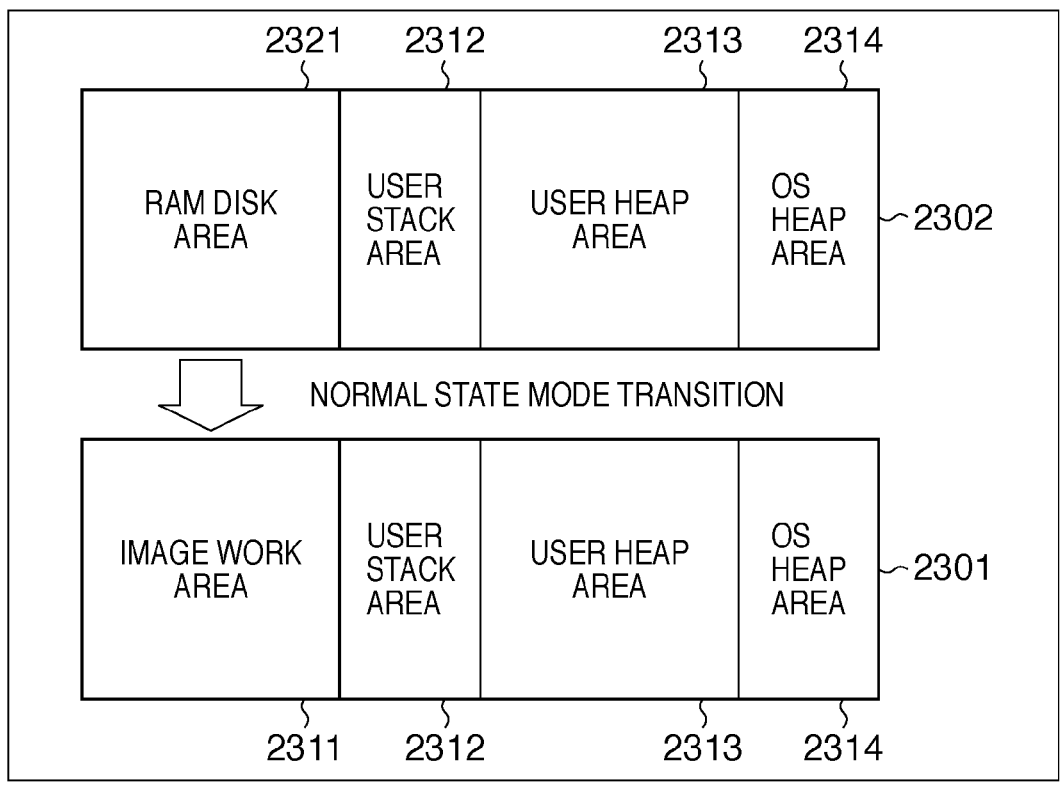
FIG. 29 shows the content of memory in the MFP 101 according to the third embodiment.

Next, a process of setting the RAM disk area 2321 in the main storage device will be described with reference to FIG. 29. FIG. 29 shows the content of memory in the MFP 101 according to the third embodiment. FIG. 29, different from FIG. 23, shows the content of memory in the MFP 101 in the case where the operating mode of the MFP 101 transitions from power saving mode to normal operating mode.

As shown in FIG. 29, the MFP 101 is frequently requested to access the image work area 2311, since copying and printing are implemented while in normal operating mode. In view of this, the MFP controller 302 resets the RAM disk area 2321 used while in power saving mode to the image work area 2311 when returning to normal operating mode. Note that the user stack area 2312, the user heap area 2313 and the OS heap area 2314 are retained as they were in power saving mode, similar to when transitioning from normal operating mode to power saving mode.

As described above, an information processing apparatus according to the present embodiment may restore a data selection table defining a priority order of data to be transferred from nonvolatile memory to volatile memory, when transitioning to power saving mode. The information processing apparatus can thereby easily and suitably select data to be stored.

The information processing apparatus may modify the priority order defined in the above data selection table, if an access occurs while in power saving mode with respect to data other than the data stored in volatile memory when transitioning to power saving mode. The information processing apparatus is thereby able to select data to be stored with greater precision, when the process of transitioning to power saving mode is next performed.

Further, the information processing apparatus may, when transitioning to power saving mode, store an update table defining information that shows whether data transferred from nonvolatile memory to volatile memory has been modified while in power saving mode. The information processing apparatus is thereby able to minimize data to be updated, resulting in reduction in processing load, when transitioning from power saving mode to normal operating mode.

The present invention may include an information processing apparatus that is provided with a volatile first storage unit and a nonvolatile second storage unit, and that reduces power supply to the second storage unit in power saving mode, and maintains power saving mode without resuming power supply to the second storage unit even if there is an access to the second storage unit by an operating system of the information processing apparatus, and a control method thereof.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-052577, filed on Mar. 3, 2008, which is hereby incorporated by reference herein in its entirety.

What is claimed is:

1. An information processing apparatus that is provided with a volatile first storage unit and a nonvolatile second storage unit and that has a normal operating mode and a power saving mode in which power consumption is reduced relative to the normal operating mode, comprising:
  a storing unit configured to, when the operating mode transitions from the normal operating mode to the power saving mode, store a portion of data stored in the second storage unit in an image area of the first storage unit, the image area being used in the normal operating mode;
  a power control unit configured to, when the operating mode transitions from the normal operating mode to the power saving mode, reduce power supply to the second storage unit; and
  a recognition unit configured to cause an operating system of the information processing apparatus to recognize a storage area of the first storage unit in which the portion of data is stored as a storage unit replacing the second storage unit,
  wherein the portion of data is data in a swap storage area of the second storage unit, and
  the recognition unit causes the operating system to recognize, when the operating mode transitions from the normal operating mode to the power saving mode, the storage area of the first storage unit in which the portion of data is stored as the swap storage area of the second storage unit,
  wherein, the image area is for storing image data and page description language data that is not directly used by the operating system,
  wherein, when the operating mode again transitions to the power saving mode after having returned from the power saving mode to the normal operating mode, the storing unit only stores data modified while in the normal operating mode in the second storage unit, out of the portion of data stored in the first storage unit when the operating mode previously transitioned to the power saving mode.

2. The information processing apparatus according to claim 1, further comprising an access restriction unit configured to restrict access to the second storage unit while the operating mode is transitioning from the normal operating mode to the power saving mode.

3. The information processing apparatus according to claim 1, wherein the storing unit comprises an update unit configured to, when the portion of data stored in the first storage unit is modified while in the power saving mode, update data in the second storage unit based on the modified data when the operating mode returns from the power saving mode to the normal operating mode.

4. The information processing apparatus according to claim 1, further comprising a data selection storage unit configured to store, when the operating mode transitions to the power saving mode, a data selection table defining a priority order of data to be transferred from the second storage unit to the first storage unit, wherein
the storing unit selects data to be stored, based on the data selection table.

5. The information processing apparatus according to claim 1, further comprising an update information storage unit configured to store, when the operating mode transitions to the power saving mode, an update table defining information that indicates whether data transferred from the second storage unit to the first storage unit has been modified while in the power saving mode, wherein
the update unit updates data in the second storage unit based on the update table.

6. The information processing apparatus according to claim 1, wherein a storage area of the first storage unit to which the portion of data is to be stored is a storage area that will not be used in the power saving mode.

7. The information processing apparatus according to claim 1, wherein the portion of data is data which is swapped out from the first storage unit to the second storage unit in the normal operating mode.

8. An information processing apparatus that is provided with a volatile first storage unit and a nonvolatile second storage unit and that has a normal operating mode and a power saving mode in which power consumption is reduced relative to the normal operating mode, comprising:
a storing unit configured to, when the operating mode transitions from the normal operating mode to the power saving mode, store a portion of data stored in the second storage unit in the first storage unit;
a recognition unit configured to cause an operating system of the information processing apparatus to recognize a storage area of the first storage unit in which the portion of data is stored as a storage unit replacing the second storage unit;
a power control unit configured to reduce power supply to the second storage unit in response to the storage unit replacing the second storage unit becoming recognizable by the operating system;
a data selection storage unit configured to store, when the operating mode transitions to the power saving mode, a data selection table defining a priority order of data to be transferred from the second storage unit to the first storage unit, wherein the storing unit selects data to be stored, based on the data selection table; and
a modification unit configured to modify the priority order defined in the data selection table if an access occurs while in the power saving mode with respect to data other than data that was stored in the first storage unit by the storing unit when the operating mode transitioned to the power saving mode.

9. A method for controlling an information processing apparatus that is provided with a volatile first storage unit and a nonvolatile second storage unit and that has a normal operating mode and a power saving mode in which power consumption is reduced relative to the normal operating mode, the method comprising:
storing a portion of data, when the operating mode transitions from the normal operating mode to the power saving mode, in the second storage unit to an image area of the first storage unit, the image area being used in the normal operating mode;
reducing, when the operating mode transitions from the normal operating mode to the power saving mode, power supply to the second storage unit; and
causing an operating system of the information processing apparatus to recognize a storage area of the first storage unit in which the portion of data is stored as a storage unit replacing the second storage unit,
wherein the portion of data is data in a swap storage area of the second storage unit, and
causing the operating system to recognize, when the operating mode transitions from the normal operating mode to the power saving mode, the storage area of the first storage unit in which the portion of data is stored as the swap storage area of the second storage unit,
wherein, the image area is for storing image data and page description language data that is not directly used by the operating system,
wherein, when the operating mode again transitions to the power saving mode after having returned from the power saving mode to the normal operating mode, a storing unit only stores data modified while in the normal operating mode in the second storage unit, out of the portion of data stored in the first storage unit when the operating mode previously transitioned to the power saving mode.

10. A method for controlling an information processing apparatus that is provided with a volatile first storage unit and a nonvolatile second storage unit and that has a normal operating mode and a power saving mode in which power consumption is reduced relative to the normal operating mode, the method comprising:
storing, when the operating mode transitions from the normal operating mode to the power saving mode, a portion of data stored in the second storage unit in the first storage unit by a storing unit;
causing an operating system of the information processing apparatus to recognize a storage area of the first storage unit in which the portion of data is stored as a storage unit replacing the second storage unit;
reducing power supply to the second storage unit in response to the storage unit replacing the second storage unit becoming recognizable by the operating system;
storing, when the operating mode transitions to the power saving mode, a data selection table defining a priority order of data to be transferred from the second storage unit to the first storage unit, wherein the storing unit selects data to be stored, based on the data selection table; and
modifying the priority order defined in the data selection table if an access occurs while in the power saving mode with respect to data other than data that was stored in the first storage unit by the storing unit when the operating mode transitioned to the power saving mode.

\* \* \* \* \*